United States Patent
Tanaka

(10) Patent No.: US 7,717,215 B2
(45) Date of Patent: May 18, 2010

(54) SEAT BELT RETRACTOR

(75) Inventor: Koji Tanaka, Tokyo (JP)

(73) Assignee: Takata Corporation, Tokyo (JP)

( * ) Notice: Subject to any disclaimer, the term of this patent is extended or adjusted under 35 U.S.C. 154(b) by 969 days.

(21) Appl. No.: 11/430,960

(22) Filed: May 10, 2006

(65) Prior Publication Data

US 2006/0267331 A1 Nov. 30, 2006

Related U.S. Application Data

(63) Continuation-in-part of application No. 10/848,079, filed on May 19, 2004, now Pat. No. 7,278,600.

(30) Foreign Application Priority Data

May 26, 2005 (JP) ............................. 2005-154158

(51) Int. Cl.
B60R 22/34 (2006.01)
(52) U.S. Cl. ...................... 180/268; 280/806; 280/807; 242/390.9; 297/477

(58) Field of Classification Search ................. 180/268; 280/806, 807; 242/390.8, 390.9; 297/474–478
See application file for complete search history.

(56) References Cited

U.S. PATENT DOCUMENTS

| | | | | |
|---|---|---|---|---|
| 5,552,986 A * | 9/1996 | Omura et al. | ................. | 701/45 |
| 5,788,281 A * | 8/1998 | Yanagi et al. | ............... | 280/806 |
| 6,626,463 B1 * | 9/2003 | Arima et al. | ................ | 280/806 |
| 6,702,326 B1 * | 3/2004 | Fujii | .......................... | 280/806 |
| 7,128,343 B2 * | 10/2006 | Ingemarsson | ............... | 280/805 |
| 2003/0116669 A1 * | 6/2003 | Fujii et al. | ................... | 242/383 |
| 2004/0231366 A1 * | 11/2004 | Lee et al. | ...................... | 65/402 |
| 2005/0011983 A1 * | 1/2005 | Inuzuka et al. | ........... | 242/390.9 |

* cited by examiner

Primary Examiner—Paul N Dickson
Assistant Examiner—James English
(74) Attorney, Agent, or Firm—Foley & Lardner LLP

(57) ABSTRACT

A seat belt apparatus to be installed in a vehicle is structured such that a motor for rotating a spool of a seat belt retractor is controlled to drive in the belt winding direction to apply a first tension on a seat belt before a vehicle collision and the motor is controlled to drive in the belt winding direction to apply a second tension on the seat belt during the vehicle collision.

27 Claims, 11 Drawing Sheets

SEAT BELT RETRACTOR

This application is a continuation-in-part of U.S. application Ser. No. 10/848,079, filed May 19, 2004 (now U.S. Pat. No. 7,278,600).

BACKGROUND

The present invention relates to a seat belt apparatus to be installed in a vehicle.

Conventionally, seat belt apparatuses of various forms for restraining a vehicle occupant are known for vehicles such as automobiles. In such a seat belt apparatus, it is required to increase tension on a seat belt (webbing) before and/or during a vehicle collision. Specifically, it is required to increase tension on the seat belt in order to inform a vehicle occupant of danger when a vehicle collision is predicted before the vehicle collision. Further, it is required to increase tension on the seat belt in order to improve occupant restraint when a vehicle collision is unavoidable before the vehicle collision. Furthermore, it is required to increase tension on the seat belt in order to improve occupant restraint during the vehicle collision.

For example, Japanese Unexamined Patent Publication No. H6-286581 ("JP Pub. No. '581"), which is incorporated by reference herein in its entirety, discloses a seat belt apparatus capable of increasing tension on a seat belt before and/or during a vehicle collision. In the technology described in JP Pub. No. '581, a first tension is developed on the seat belt before the vehicle collision by a reversible mechanism such as an electric motor which is disposed on a buckle side, while a second tension is developed on the seat belt during the vehicle collision by a non-reversible mechanism such as pyrotechnics, which is disposed on a retractor side.

In the seat belt apparatus as described in JP Pub. No. '581, the first mechanism for increasing the seat belt tension before a vehicle collision is disposed on the buckle side and the second mechanism for increasing the seat belt tension during the vehicle collision is disposed on the retractor side. In addition, since the first and second mechanisms are composed of different mechanisms, there is a limit to achieve reduction of the apparatus size and weight and reduction of the apparatus cost.

SUMMARY

One embodiment disclosed herein relates to a seat belt retractor to be installed in a vehicle. The retractor comprises: an electric motor; a spool capable of winding and unwinding a seat belt for restraining a vehicle occupant according to the driving of the electric motor; a motor speed reduction mechanism to reduce the rotation speed of the motor via a plurality of gears positioned between a driving shaft of the electric motor and the spool; and a control mechanism to control the driving of the electric motor. In a state that the seat belt is worn by the vehicle occupant, the control mechanism performs a first setting mode by controlling the electric motor to drive in the belt winding direction to apply a first tension on the seat belt before a vehicle collision and performs a second setting mode by controlling the electric motor to drive in the belt winding direction to apply a second tension on the seat belt during the vehicle collision.

Another disclosed embodiment relates to a seat belt apparatus to be installed in a vehicle. The apparatus comprises: a seat belt to be worn by a vehicle occupant for restraining the vehicle occupant; an electric motor; a spool capable of winding and unwinding a seat belt according to the driving of the electric motor; a motor speed reduction mechanism for reducing the rotation speed of the motor via a plurality of gears positioned between a driving shaft of the electric motor and the spool; a control mechanism to control the driving of the electric motor; a buckle fixed to a vehicle body; a tongue attached to the seat belt and latched to the buckle when the seat belt is worn by the vehicle occupant; and a detection sensor to detect the latching of the tongue to the buckle. When it is determined that the seat belt is worn by the vehicle occupant according to the information detected by the detection sensor, the control mechanism performs a first setting mode by controlling the electric motor to drive in the belt winding direction to apply a first tension on the seat belt before a vehicle collision and performs a second setting mode by controlling the electric motor to drive in the belt winding direction to apply a second tension on the seat belt during the vehicle collision.

Another disclosed embodiment relates to a vehicle including a seat belt apparatus. The apparatus includes: a seat belt to be worn by a vehicle occupant for restraining the vehicle occupant; an electric motor; a spool capable of winding and unwinding a seat belt according to the driving of the electric motor; a motor speed reduction mechanism for reducing the rotation speed of the motor via a plurality of gears positioned between a driving shaft of the electric motor and the spool; a control mechanism to control the driving of the electric motor; a buckle fixed to a vehicle body; a tongue attached to the seat belt and latched to the buckle when the seat belt is worn by the vehicle occupant; and a detection sensor to detect the latching of the tongue to the buckle. When it is determined that the seat belt is worn by the vehicle occupant according to the information detected by the detection sensor, the control mechanism performs a first setting mode by controlling the electric motor to drive in the belt winding direction to apply a first tension on the seat belt before a vehicle collision and performs a second setting mode by controlling the electric motor to drive in the belt winding direction to apply a second tension on the seat belt during the vehicle collision. The seat belt apparatus is accommodated in an accommodating space in the vehicle.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 5(a) and 5(b) show the seat belt retractor of the embodiment shown in FIG. 4 without a retainer cover, wherein FIG. 5(a) is a perspective view thereof and FIG. 5(b) is a left side view thereof.

FIGS. 6(a) and 6(b) show a sun gear member used in the seat belt retractor of the embodiment shown in FIG. 4, wherein FIG. 6(a) is a perspective view thereof and FIG. 6(b) is a perspective view thereof as seen from a direction of IIIB in FIG. 6(a).

DETAILED DESCRIPTION

Figure 1:
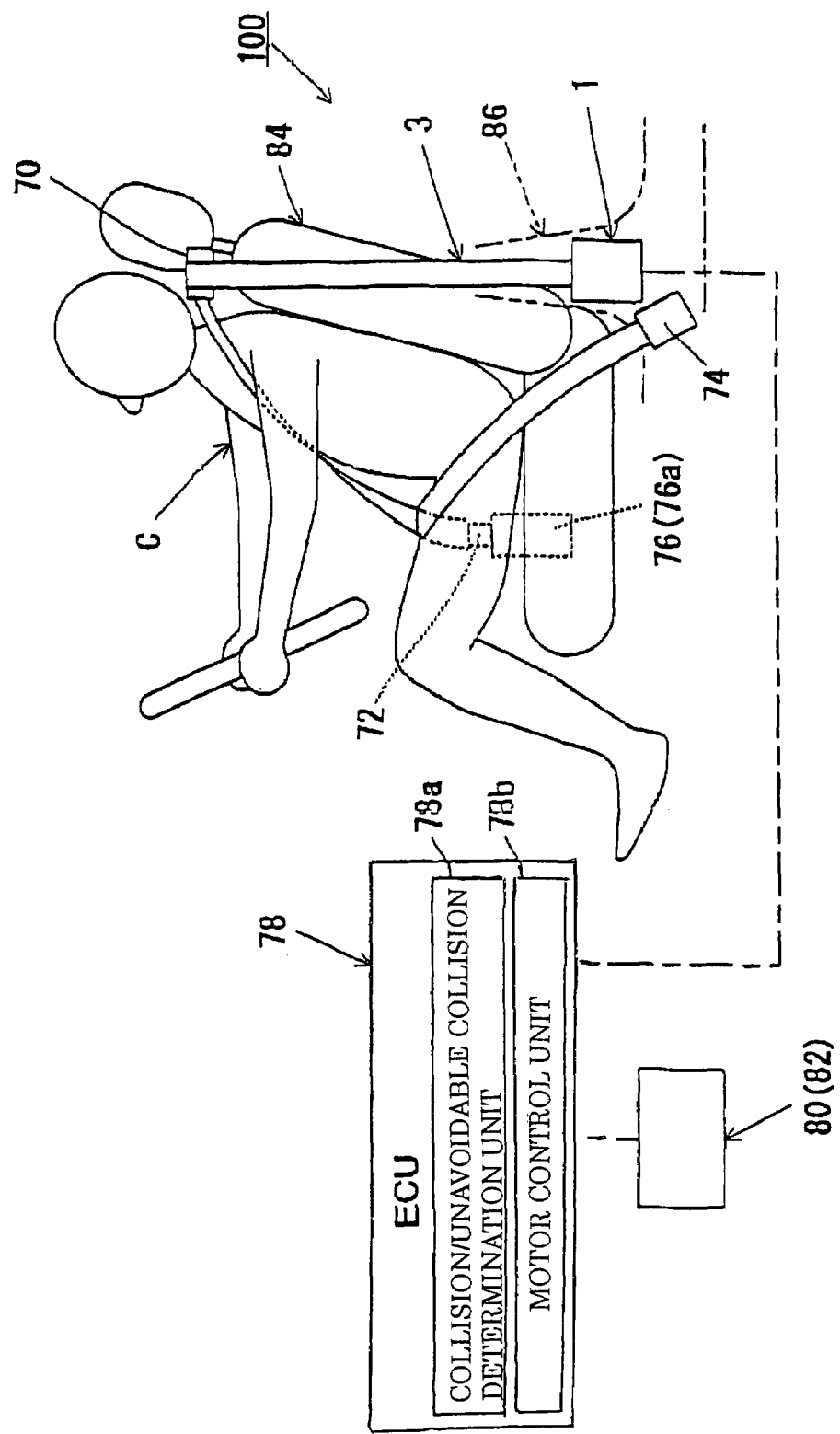
FIG. 1 is an illustration schematically showing the structure of a seat belt apparatus of an embodiment according to the present invention.

An object of the disclosed embodiments is to provide a technology effective for developing a reasonable seat belt apparatus to be installed in a vehicle.

Embodiments of the present invention can be typically adopted to a seat belt apparatus to be installed in an automobile. In addition, embodiments of the present invention can be applied to a technology for developing a seat belt apparatus to be installed in a vehicle other than the automobile, such as aircraft, boat, train, and bus.

The seat belt retractor of a first embodiment is one of components of a seat belt apparatus (sometimes referred to as "occupant restraint system") to be installed in a vehicle and comprises at least an electric motor, a spool, a motor speed reduction mechanism, and a control mechanism.

The electric motor is an electrically operated motor and functions as a drive source for driving the spool for winding or unwinding the seat belt. In embodiments of the present invention, the electric motor may be composed of a single motor or a combination of a plurality of motors. The spool in embodiments of this invention is a member which is capable of winding or unwinding the seat belt for restraining the vehicle occupant according to the driving of the electric motor. The seat belt for occupant restraint capable of being wound onto and unwound from the spool is a long belt to be worn by a vehicle occupant seated in a seat and is sometimes called a "webbing". Typically, the vehicle occupant seated in the vehicle seat is restrained by the seat belt when restraint is required such as a vehicle collision. In embodiments of the present invention, the motor speed reduction mechanism is arranged between the driving shaft of the electric motor and the spool. The motor speed reduction mechanism is a mechanism for reducing the rotation speed of the motor via a plurality of gears. Accordingly, the rotation of the electric motor is transmitted to the spool with the rotation speed being reduced by the motor speed reduction mechanism.

The disclosed control mechanism is adapted at least as a mechanism to control the driving of the electric motor and controls the driving direction, the driving time, and the output of the electric motor. The control mechanism is typically composed of a CPU (central processing unit), an input/output unit, a storage unit, a peripheral unit, and the like. The control mechanism may be provided exclusively for the seat belt retractor or used also for other control mechanism for controlling driving circuits and/or electric circuits.

In a state that the seat belt is worn by the vehicle occupant, the control mechanism of embodiments can perform a first setting mode and a second setting mode.

In the first setting mode, the control mechanism controls the electric motor to drive in the belt winding direction before a vehicle collision so as to apply a first tension on the seat belt. Specifically, the first setting mode includes a mode for warning the vehicle occupant (driver) about prediction of a vehicle collision or dozing of the driver, a mode for restraining the vehicle occupant from changing his or her posture due to emergency braking when a vehicle collision is unavoidable, a mode for restraining the vehicle occupant at such a level not to give any stress during normal driving, and the like.

Accordingly, the spool is rotated to wind up the seat belt via the electric motor and the motor speed reduction mechanism before the vehicle collision so as to increase the tension on the seat belt.

On the other hand, in the second setting mode, the control mechanism controls the electric motor to drive in the belt winding direction during a vehicle collision so as to apply a second tension on the seat belt. Accordingly, the spool is rotated to wind up the seat belt via the electric motor and the motor speed reduction mechanism during a vehicle collision so as to increase the tension on the seat belt. Specifically, the second setting mode includes a mode for securely conducting initial restraint of the vehicle occupant when the vehicle collision actually occurs. The second tension in the second setting mode may be the same as or different from the first tension in the first setting mode. "During vehicle collision" includes timing after actual occurrence of a vehicle collision until the tension on the seat belt is actually increased by the driving of the electric motor according to the control signal from the control mechanism.

In various embodiments, the action of increasing the tension on the seat belt before the vehicle collision and during the vehicle collision are both conducted by using the same power source (the electric motor) and the same mechanism (the motor speed reduction mechanism, the spool, and the like) which are arranged on the seat belt retractor side.

Therefore, by employing the seat belt retractor as disclosed, it is possible to develop a seat belt apparatus which is effective in reducing the size, the weight and the cost of the apparatus as compared to an apparatus using different mechanisms as a mechanism for increasing the tension on the seat belt before a vehicle collision and a mechanism for increasing the tension on the seat belt during the vehicle collision.

In the seat belt retractor of a second embodiment, the control mechanism controls the electric motor to perform the first setting mode when a vehicle collision is predicted before the vehicle collision or when a vehicle collision is unavoidable before the vehicle collision and the control mechanism controls the electric motor to perform the second setting mode when the vehicle collision occurs, and the second tension is larger than the first tension. Specifically, in the second setting mode, the control mechanism controls the electric motor to have higher current value (sometimes referred to as "control current value") and/or higher voltage value (sometimes referred to as "applied voltage value") than those in the first setting mode, so as to change the output and the number of rotations (the rotation speed) of the electric motor, thereby achieving relative increase in tension on the seat belt with regard to the winding action.

According to the aforementioned structure, the control mechanism performs the first setting mode when a vehicle collision is predicted before the vehicle collision, thereby winding up the seat belt to increase the tension on the seat belt in order to inform a vehicle occupant of danger (informing or warning action). The control mechanism performs the first setting mode when a vehicle collision is unavoidable before the vehicle collision, thereby winding up the seat belt to increase the tension on the seat belt in order to improve the vehicle occupant restraint (occupant restraint action before the vehicle collision). On the other hand, the control mechanism performs the second setting mode when the vehicle collision occurs, thereby winding up the seat belt to increase the tension on the seat belt in order to improve the initial restraint (occupant restraint action during the vehicle collision).

The seat belt apparatus of a third embodiment is an apparatus comprising an occupant restraint system to be installed in a vehicle and comprises at least a seat belt, an electric motor, a spool, a motor speed reduction mechanism, a control mechanism, a buckle, a tongue, and a detection sensor.

The seat belt may be a long belt to be worn by a vehicle occupant seated in a seat and is sometimes called a "webbing". Typically, the vehicle occupant seated in the vehicle seat is restrained by the seat belt when restraint is required such as before and/or during a vehicle collision. The buckle of embodiments of the present invention is a member fixed to a vehicle body. The tongue is a member which is attached to the seat belt and is latched to the buckle when the seat belt is worn by the vehicle occupant. The detection sensor of embodiments of the present invention is a mechanism to detect the latching of the tongue to the buckle. According to the information detected by the detection sensor, it is determined whether the seat belt is worn by the vehicle occupant or not. The electric motor, the spool, the motor speed reduction mechanism, and the control mechanism of embodiments of this invention have substantially the same functions as those of the seat belt retractor described in the first embodiment.

Therefore, according to the structure of various embodiments, it is possible to develop a seat belt apparatus which is effective in reducing the size, the weight and the cost of the apparatus.

In the seat belt apparatus of a fourth embodiment, the control mechanism as described in the third embodiment, controls the electric motor to perform the first setting mode when a vehicle collision is predicted before the vehicle collision or when a vehicle collision is unavoidable before the vehicle collision and the control mechanism controls the electric motor to perform the second setting mode when the vehicle collision occurs, and the second tension is larger than the first tension.

According to the aforementioned structure, the control mechanism performs the first setting mode when a vehicle collision is predicted before the vehicle collision, thereby winding up the seat belt to increase the tension on the seat belt in order to inform a vehicle occupant of danger, similarly to the works and effects of the invention as described in the above embodiments (informing or warning action). The control mechanism performs the first setting mode when a vehicle collision is unavoidable before the vehicle collision, thereby winding up the seat belt to increase the tension on the seat belt in order to improve the vehicle occupant restraint (occupant restraint action before the vehicle collision). On the other hand, the control mechanism performs the second setting mode when the vehicle collision occurs, thereby winding up the seat belt to increase the tension on the seat belt in order to improve the initial restraint (occupant restraint action during the vehicle collision).

The vehicle with a seat belt apparatus of a fifth embodiment comprises at least a seat belt apparatus as described in one or all of the above embodiments. In the vehicle of embodiments, the seat belt apparatus is accommodated in an accommodating space in the vehicle such as an accommodating space in a pillar, an accommodating space in a seat, or an accommodating space in another part of the vehicle.

This structure enables to provide a vehicle in which a reasonable seat belt apparatus which is effective in reducing the size, the weight and the cost of the apparatus is accommodated in an accommodating space in the vehicle.

As described in the above, embodiments of the present invention relate to a seat belt apparatus to be installed in a vehicle and enables reduction in size, weight and cost of the apparatus by employing a structure in which the action of increasing the seat belt tension before a vehicle collision and the action of increasing the seat belt tension during the vehicle collision are both conducted by using the same power source (electric motor) and the same mechanism (motor speed reduction mechanism, spool, and the like).

Hereinafter, embodiments of the present invention will be described in detail with reference to drawings. First, description will be made with regard to a seat belt apparatus 100 as an embodiment of "a seat belt apparatus" according to embodiments of the present invention with reference to FIG. 1 through FIG. 9.

The structure of the seat belt apparatus 100 of this embodiment is schematically shown in FIG. 1.

As shown in FIG. 1, the seat belt apparatus 100 of this embodiment is a seat belt apparatus for a vehicle to be installed in an automotive vehicle as "a vehicle with a seat belt apparatus" of embodiments of the present invention and comprises a seat belt retractor 1, a seat belt 3, a deflection fitting 70, a tongue 72, an outer anchor 74, a buckle 76, and an ECU 78. The ECU 78 may be considered a component of the seat belt retractor 1.

In addition, an input element 80 is installed in the vehicle to detect information about collision prediction or collision occurrence of the vehicle, information about the driving state of the vehicle, information about the sitting position and the body size of a vehicle occupant seated in a vehicle seat, information about traffic conditions around the vehicle, information about weather condition and about time zone, and the like and to input such detected information to the ECU 78. The detected information of the input element 80 is transmitted to the ECU 78 constantly or at predetermined intervals and is used for the operation control of the seat belt apparatus 100 and the like.

The input element 80 of this embodiment includes a collision information detection sensor 82 for detecting information about a vehicle collision such as a prediction of a vehicle collision and an occurrence of an actual vehicle collision. The collision information detection sensor 82 is a sensor capable of detecting (measuring) information (signals) about distance, speed, and acceleration of a collision object relative to the subject vehicle and also detecting (measuring) accelerations in three-axial (X-axis, Y-axis, and Z-axis) directions acting on the subject vehicle. The collision information detection sensor 82 may comprise a single detection sensor or a combination of plural detection sensors. Specifically, millimeter wave radar, laser radar, acceleration sensor, camera sensor, and the like may be used in the collision information detection sensor 82.

The seat belt 3 is a long belt (webbing) to be used for restraining a vehicle occupant C (sometimes referred to as "driver") seated in a vehicle seat 84 as a driver's seat. The seat belt 3 corresponds to the "seat belt for vehicle occupant restraint" of embodiments of the present invention. The seat belt 3 is withdrawn from the seat belt retractor 1 fixed relative to the vehicle and extends through the deflection fitting 70 provided around an area about the shoulder of the vehicle occupant C and is connected to the outer anchor 74 through the tongue 72. The deflection fitting 70 has a function of holding the seat belt 3 to the area about the shoulder of the occupant C and guiding the seat belt 3. By inserting (latching) the tongue 72 to the buckle 76 fixed to the vehicle body, the seat belt 3 becomes into the state worn by the vehicle occupant C. The tongue 72 corresponds to the "tongue" of embodiments of the present invention and the buckle 76 to which the tongue 72 can be latched corresponds to the "buckle" of embodiments of the present invention.

The buckle 76 has a built-in buckle switch 76a. The buckle switch 76a detects that the tongue 72 is inserted into the buckle 76 so as to buckle the seat belt (actually, detects that the seat belt becomes into the worn state). The information detected by the buckle switch 76a is transmitted to the ECU 78 which determines whether the seat belt 3 is in the worn state or not. The buckle switch 76a corresponds to the "detection sensor for detecting that the tongue is latched to the buckle" of embodiments of the present invention. As a mechanism for detecting whether the seat belt is in the worn state or not, a various sensors or switches may be used. Alternatively, instead of using the buckle switch 76a, a structure may be employed in which the withdrawal amount of the seat belt 3 is detected and it is determined that the seat belt is in the worn state when the withdrawal amount exceeds a predetermined amount.

The seat belt retractor 1 is a device capable of performing the action of winding or unwinding the seat belt 3 via a spool 52 and a motor 53 as will be described later and corresponds to the "seat belt retractor" of embodiments of the present invention. The seat belt retractor 1 is installed in an accommodating space in a B-pillar 86 of the vehicle in the embodiment shown in FIG. 1.

The ECU 78 has a function of conducting the control of the seat belt retractor 1 and other operational mechanisms based on the input signals from the input element 80 and comprises a CPU (central processing unit), an input/output unit, a storage unit, a peripheral unit, and the like. Particularly in this embodiment, the ECU 78 comprises at least a collision/unavoidable collision determination unit 78a and a motor control unit 78b. The ECU 78 composes the "control mechanism" of embodiments of the present invention.

The collision/unavoidable collision determination unit 78a has a function of determining an occurrence of actual collision and a prediction of a vehicle collision based on the information detected by the collision information detection sensor 82. The information as a result of the determination is used for control of the motor 53 in "retractor control" as will be later. The motor control unit 78b is constructed as a mechanism of conducting the drive control of the motor 53. Specifically, the motor control unit 78b controls the amount of current supplied to an electromagnetic coil of the motor 53 and the direction of the current supply so as to vary the rotational speed, the rotational direction, the rotational period of time, and the rotational torque (output) of a shaft of the motor 53.

The ECU 78 of this embodiment may be exclusive to the seat belt retractor 1 or used also for other control mechanism for controlling driving circuits and/or electric circuits.

Figure 2:
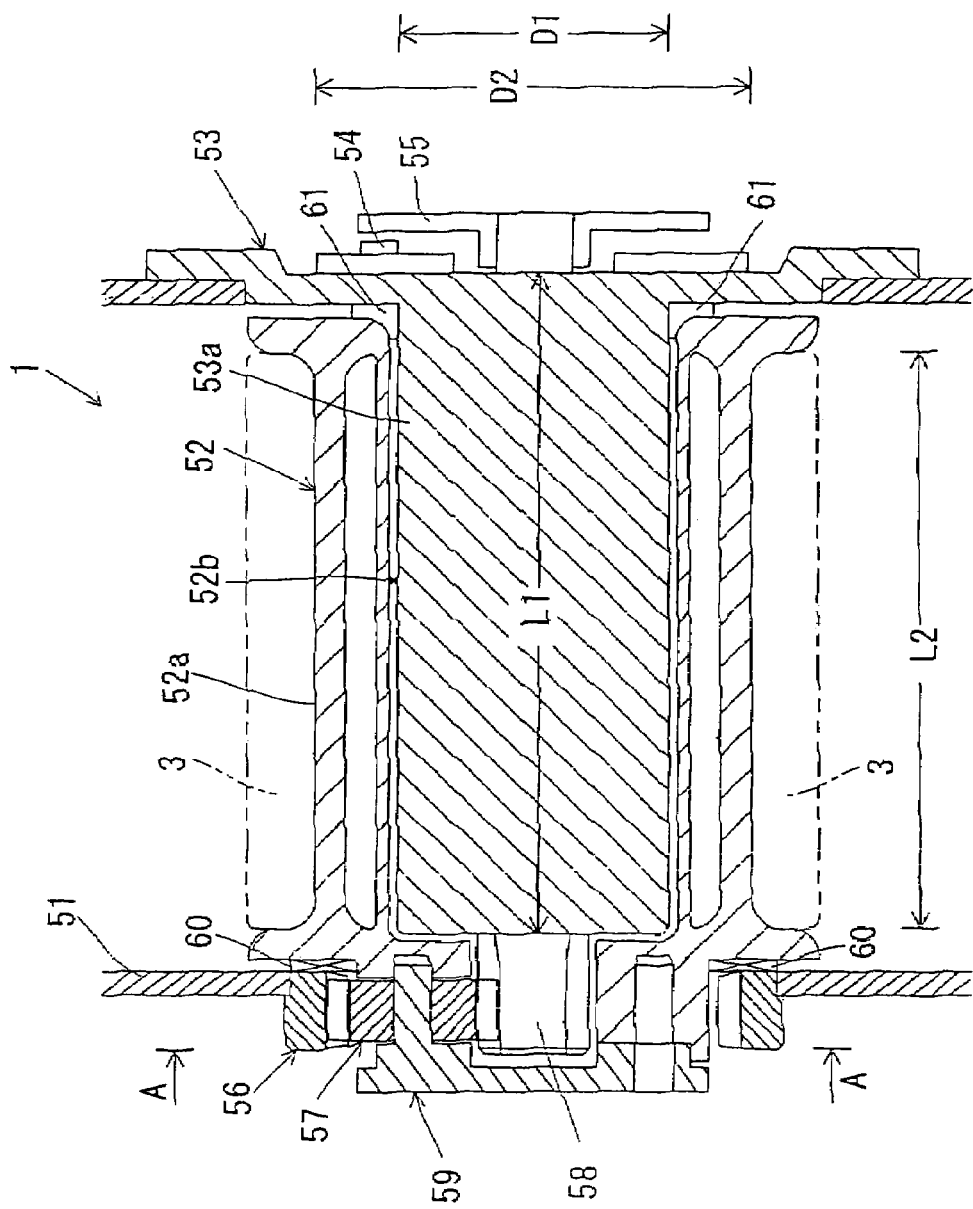
FIG. 2 is a sectional view showing the structure of a seat belt retractor shown in FIG. 1.
Figure 3:
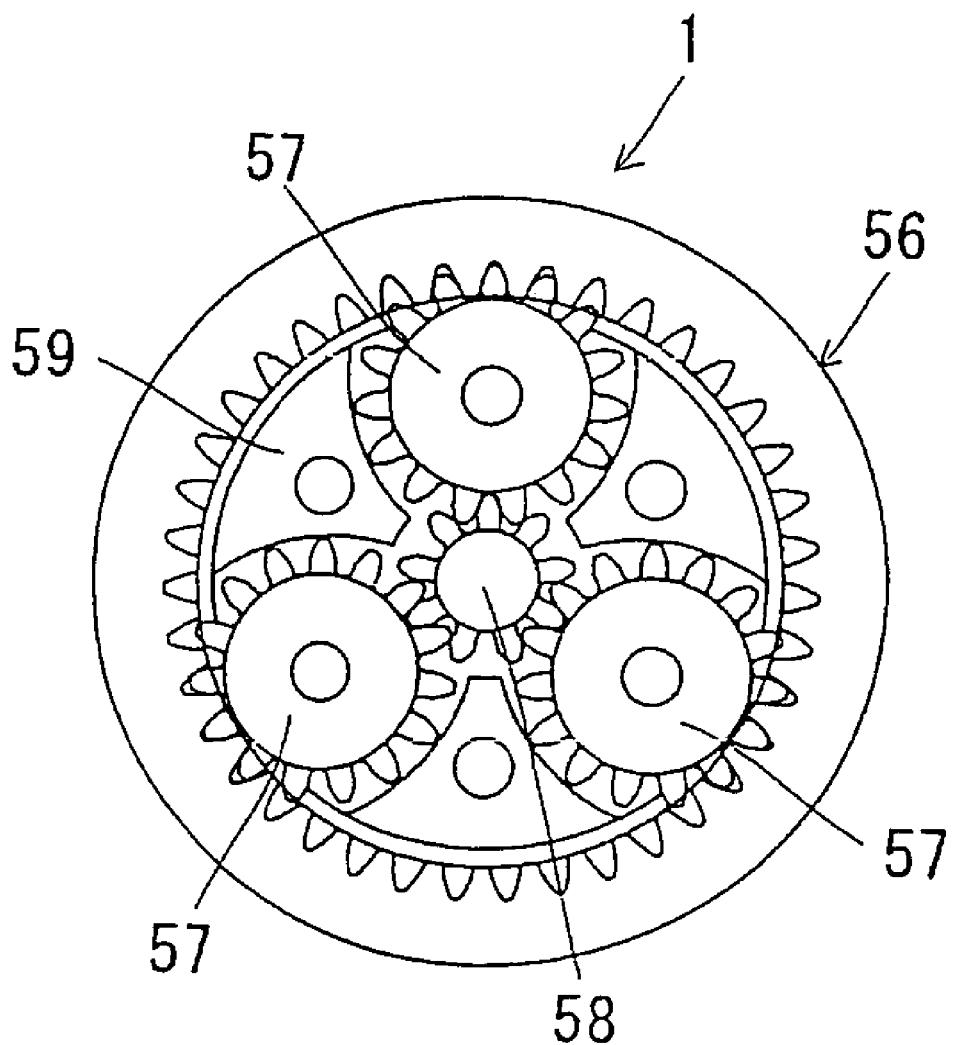
FIG. 3 is a sectional view on arrows of a line A-A of the seat belt retractor shown in FIG. 2.

The seat belt retractor composing the seat belt apparatus 100 may be a seat belt retractor 1 of a first embodiment shown in FIG. 2 and FIG. 3 or a seat belt retractor 1' of a second embodiment shown in FIG. 4 through FIG. 9.

Detail description of a seat belt retractor 1 of the first embodiment will be described with reference to FIG. 2 and FIG. 3. FIG. 2 is a sectional view showing the structure of the seat belt retractor 1 shown in FIG. 1 and FIG. 3 is a sectional view on arrow along a line A-A of the seat belt retractor of FIG. 2.

As shown in FIG. 2, the seat belt retractor 1 of the first embodiment has a base frame (retractor body frame) 51 fixed to the vehicle body and comprises a spool (wind-up shaft) 52, a motor 53, a Hall sensor 54, an electromagnetic disk 55, an internal gear 56, planetary gears 57, a sun gear 58, a carrier 59, and bearings 60, 61 which are arranged within the base frame 51.

The spool 52 of the seat belt retractor 1 is rotatably supported on the base frame 51. The spool 52 is a member for conducting winding and unwinding the seat belt 3 according to the driving of the single motor 53 and corresponds to the "spool" of embodiments of the present invention. Specifically, the spool 52 is allowed to rotate relative to fixed members by a bearing 60 arranged between the spool 52 and the internal gear 56 which is a fixed member and a bearing 61 arranged between the spool 52 and the body of the motor 53 as another fixed member. That is, the spool 52 and the motor housing 53a of the motor 53 are supported relative to each other by the bearing mechanism (bearing 60) arranged between the outer surface of the spool and the inner surface of the internal gear and the bearing mechanism (bearing 61) arranged between the inner surface of the spool and the outer surface of the motor housing. According to this structure, the rotation of the spool 52 relative to a motor housing 53a is allowed by a simple bearing structure.

In the seat belt retractor 1, the seat belt 3 can be wound onto the outer periphery 52a of the spool 52 or unwound from the outer periphery 52a of the spool 52. That is, the outer periphery 52a of the spool 52 is structured as the surface to be in contact with the seat belt 3. As will be described in detail later, the unwinding operation (unwinding action) of unwinding the seat belt 3 from the spool 52 is conducted by the rotation of the motor shaft (driving shaft) of the motor 53 in one direction, and the winding operation (winding action) of winding the seat belt 3 onto the spool 52 is conducted by the rotation of the motor shaft of the motor 53 in the other direction.

According to the structure of this embodiment in which the spool 52 is driven to rotate by the motor 53, a spring mechanism for biasing the spool 52 in the seat belt winding direction can be eliminated. The spring mechanism is generally located adjacent to the spool in the width direction of the spool 52. Therefore, the elimination of the spring mechanism reduces the size relating to the width direction of the spool 52, thereby enabling the further reduction in overall size of the seat belt retractor 1.

The spool 52 is formed into a hollow cylindrical shape of which one end is closed and the other end is open. The motor 53 is inserted into of a cylindrical hollow space 52b through the open end and is accommodated in the hollow space 52b. In the state that the motor 53 is accommodated in the hollow space 52b of the spool 52, the motor housing 53a of the motor 53 extends along the axial direction of the motor 53 which extends along the width direction of the spool outer periphery 52a of the spool 52.

In the state that the motor 53 is accommodated, three dimensions, i.e., the size L1 of the motor housing 53a of the motor 53 in the axial direction, the size L2 of the spool outer periphery 52a of the spool 52 in the width direction, and the width of the seat belt 3, are broadly equal to each other. That is, in this embodiment, the size of the motor housing 53a in the axial direction and the size of the spool outer periphery 52a in the width direction are set to correspond to the standard width of the seat belt 3. As shown in FIG. 2, in this embodiment, the overall size of the spool 52 in the width direction is nearly equal to the size of the spool outer periphery 52a in the width direction. That is, the four dimensions, i.e. the overall size of the spool 52 in the width direction, the size L1 of the motor housing 53a in the axial direction, the size L2 of the spool outer periphery 52a in the width direction, and the width of the seat belt 3 are broadly equal to each other.

According to this structure, the width of the spool 52 can be reduced to correspond to the size of the motor housing 53a in the axial direction, thereby reducing the overall size relating to the axial direction of the retractor 1. Therefore, the miniaturization of the retractor 1 and the seat belt apparatus 100 to be installed in the vehicle is achieved, thereby increasing the degree of freedom of location of the seat belt retractor 1 and the seat belt apparatus 100 in the vehicle. The motor housing 53a is designed to have the maximum size in the axial direction within the range of the width of the spool 52, allowing the use of a motor with higher output.

According to the structure of this embodiment that the motor 53 is accommodated in the cylindrical space of the spool 52, the reduction in size and the reduction in weight of the retractor 1 are achieved and, in addition, the noise insulation and the electromagnetic-wave shielding in the operation of the motor 53 are improved.

In this embodiment, it is preferable that the ratio of the outside diameter D1 of the motor housing 53a of the motor 53 relative to the outside diameter D2 of the spool outer periphery 52a of the spool 52, i.e. D1/D2, is set to be 0.8 or less. The ratio (D1/D2) can be suitably set within a range including 0.8 and under 0.8. For example, the outside diameter D1 of the motor 53 may be 40 (mm) and the outside diameter D2 of the spool outer periphery 52a of the spool 52 may be 55 (mm). In this case, the ratio (D1/D2) is about 0.73. According to this structure, the size of the spool 52 in the radial direction can be reduced to correspond to the size of the motor 53 in the radial direction, thereby enabling the reduction in overall size relating to the radial direction of the retractor 1.

Further, the spool 52 of this embodiment defines the substantial outer profile of the seat belt retractor 1 and forms a "seat belt retractor housing" in which at least main components of the spool such as the motor 53 are accommodated. In this embodiment, the correlation among the volume V1 of the motor housing 53a of the motor 53 (i.e., volume occupied by the motor housing 53a), the volume V2 of the cylinder portion of the spool 52, and the storage volume V3 within the seat belt retractor housing is set to achieve the equation V3<V1+V2. In this embodiment, the volume V2 of the spool 52 substantially coincides with the storage volume V3 within the seat belt retractor housing. The storage volume V3 within the seat belt retractor housing is typically defined as the volume of the inner space of a roll formed by the seat belt in the wound-up state. The setting range of these volume is defined as a retractor miniaturization adjustment range effective for reducing the size of the seat belt retractor, taking the volumes relative to the spool and the motor into consideration. It is further preferable to achieve the equation V3<(V1+V2)×N, wherein 0.5<N<1. For securely achieving the reduction in size and the reduction in weight of the retractor, the N in V3<(V1+V2)×N is preferably in a range of 0.55<N<0.95, more preferably 0.55<N<0.85, especially preferably 0.55<N<0.75.

In this embodiment, the ratio (V1/V2) of the volume V1 of the motor housing 53a of the motor 53 (i.e., volume occupied by the motor housing 53a) to the volume V2 of the cylinder portion of the spool 52 is set to be within a retractor miniaturization adjustment range about the volume ratio in which the ratio (V1/V2) is 40 percent (about 0.4) or more and less than 100 percent (about 1).

The retractor miniaturization adjustment range as mentioned above is defined as a range effective for reducing the size of the seat belt retractor 1, taking the volumes relative to the spool 52 and the motor 53 of this embodiment into consideration. Specifically, as shown in FIG. 2, the size of the retractor 1 in the width direction is broadly equal to the size L1 of the motor housing 53a in the axial direction and the size L2 of the spool outer periphery 52a of the spool 52 in the width direction. Therefore, by suitably setting the relative sizes of the spool 52 and the motor 53 in the radial direction, the relationship among the respective volumes corresponding to the retractor miniaturization adjustment range is substantially set. According to this structure, the miniaturization of the retractor is achieved. The seat belt retractor 1 having the aforementioned dimensional structure according to this embodiment can be accommodated in a relatively narrow area of a vehicle for the purpose of use by a passenger in a rear seat of a sedan-type automobile. Though the seat belt retractor 1 has reduced size for the passenger in the rear seat, the seat belt retractor 1 can be, of course, accommodated in the vehicle for the purpose of use by a driver or a passenger in a front seat.

The motor 53 of this embodiment is a single electric motor of a type, so-called "brushless motor of inner rotor type". The motor 53 corresponds to the "electric motor" of embodiments of the present invention. The motor 53 uses a magnet as a rotor and a coil as a stator which are accommodated in the motor housing 53a. The stator is disposed around the rotor. The motor 53 is structured such that the motor shaft is rotated according to the rotation of the rotor. In the motor 53, the Hall sensor (a magnetic position detector) 54 is mounted on a side of the motor housing 53a and the magnetic disc 55 is mounted on a side of the rotor. The Hall sensor 54 and the magnetic disc 55 cooperate together to detect the position of the rotor. From the information of the detection, the amount of winding or unwinding the seat belt 3 is obtained. Based on the amount of winding or unwinding of the seat belt 3, the rotational speed of the motor and the load of the motor can be controlled. In this embodiment, as mentioned above, the mechanism for detecting the position of the rotor in the motor 53 are also used as a mechanism for detecting the amount of winding or unwinding the seat belt 3. Therefore, the use of the blushless motor such as the motor 53 is economical because sensors for exclusive use of detecting the rotational speed and rotational direction of the rotor and of detecting the amount of winding or unwinding the seat belt 3 can be eliminated. The blushless motor such as the motor 53 is effective for reducing the size of the body, improving the output, and improving the heat radiation property.

As shown in FIG. 2 and FIG. 3, the motor shaft (the driving shaft) of the motor 53 is adapted to have the sun gear 58. Three planetary gears 57 mesh with the outer periphery of the sun gear 58. The number of the planetary gears 57 is not limited to three and may be suitably set as required. The outer peripheries of the planetary gears 57 mesh with inner periphery of the internal gear 56. That is, a gear train, so-called "planetary gear mechanism" is constructed in which the planetary gears 57 are arranged between the internal gear 56 and the sun gear 58. The internal gear 56 is fixed to the base frame 51. The planetary gears 57 are rotatably supported by the carrier 59 and the spool 52 is connected to the carrier 59. The internal gear 56, the planetary gears 57, the sun gear 58 compose together a speed-reduction mechanism (corresponding to the "motor speed-reduction mechanism for reducing the rotation of the motor via a plurality of gears" of embodiments of the present invention) of the motor 53. In this embodiment, the motor speed-reduction mechanism is located adjacent to the motor housing 53a relative to the axial direction of the motor housing 53a. Further in this embodiment, the plural gears forming the motor speed-reduction mechanism are arranged to extend on the same plane in a direction perpendicular to the axial direction of the shaft of the motor.

According to the structure, the size relating to the axial direction of the motor speed-reduction mechanism can be reduced by arrangement of the plural gears, thereby further reducing the overall size relating to the axial direction of the retractor 1 including the motor speed-reduction mechanism. Therefore, the reduction in size of the retractor 1 and the seat belt apparatus 100 to be installed in the vehicle is achieved.

In this embodiment, the three dimensions, i.e. the first size relating to the width direction of the spool outer periphery 52a, the second size which is the size relating to the axial direction of the motor housing 53a plus the size relating to the axial direction of the motor speed-reduction mechanism, and the width of the seat belt 3 are broadly equal to each other. That is, in this embodiment, the first size and the second size are set to correspond to the standard width of the seat belt 3. As shown in FIG. 2, in this embodiment, the overall size of the spool 52 in the width direction is nearly equal to the size of the spool outer periphery 52a in the width direction. That is, the four dimensions, i.e. the overall size of the spool 52 in the width direction, the first size, the second size, and the width of the seat belt 3 are broadly equal to each other. According to this structure, the width of the spool 52 can be reduced to correspond to the size of the combination of the motor housing 53a with the motor speed-reduction mechanism in the axial direction, thereby reducing the overall size relating to the axial direction of the seat belt retractor.

In this embodiment, the driving shaft (motor shaft) as the rotational axis of the motor 53, the spool shaft as the rotational axis of the spool 52, the speed-reduction shaft as the rotational axis of the sun gear 58 as one component of the speed-reduction mechanism are generally aligned in a straight line along the width direction of the spool outer periphery 52a. According to the structure, the simplification and miniaturization of the motor speed-reduction mechanism are achieved and the sizes relating to the radial direction of the motor 53, the spool 52, and the motor speed-reduction mechanism are reduced, thereby enabling the reduction in overall size and weight of the retractor.

In the aforementioned structure of the retractor 1, as the motor shaft of the motor 53 is rotated, the three planetary gears 57 meshing with the sun gear 58 move around the speed-reduction shaft of the sun gear 58 (the driving shaft of the motor 53), whereby the spool 52 rotates via the carrier 59. For example, when the sun gear 58 rotates about the speed-reduction shaft in the clockwise direction in FIG. 3, the three planetary gears 57 rotate about their axes in the counterclockwise direction and move around the sun gear 58 in the clockwise direction between the external teeth of the sun gear 58 and the internal teeth of the internal gear 56. On the other hand, when the sun gear 58 rotates about the speed-reduction shaft in the counterclockwise direction, the three planetary gears 57 rotate about their axes in the clockwise direction and move around the sun gear 58 in the counterclockwise direction between the external teeth of the sun gear 58 and the internal teeth of the internal gear 56. During this, the rotation of the motor 53 is transmitted to the spool 52 while the rotational speed is reduced to some fraction of the rotational speed of the motor 53 and the torque is increased. By the rotational torque transmitted to the spool 52, the seat belt 3 is wound onto or unwound from the outer periphery of the spool 52. According to this structure, the motor speed-reduction mechanism is simplified, thereby enabling the reduction in overall size and weight of the retractor.

Detail description of a seat belt retractor 1' of the second embodiment will be described with reference to FIG. 4 through FIG. 9. The retractor 1' is a device capable of performing the action of winding or unwinding the seat belt 3 via a spool 4 and a motor 6 as will be described later and corresponds to the "seat belt retractor" of embodiments of the present invention.

Figure 4:
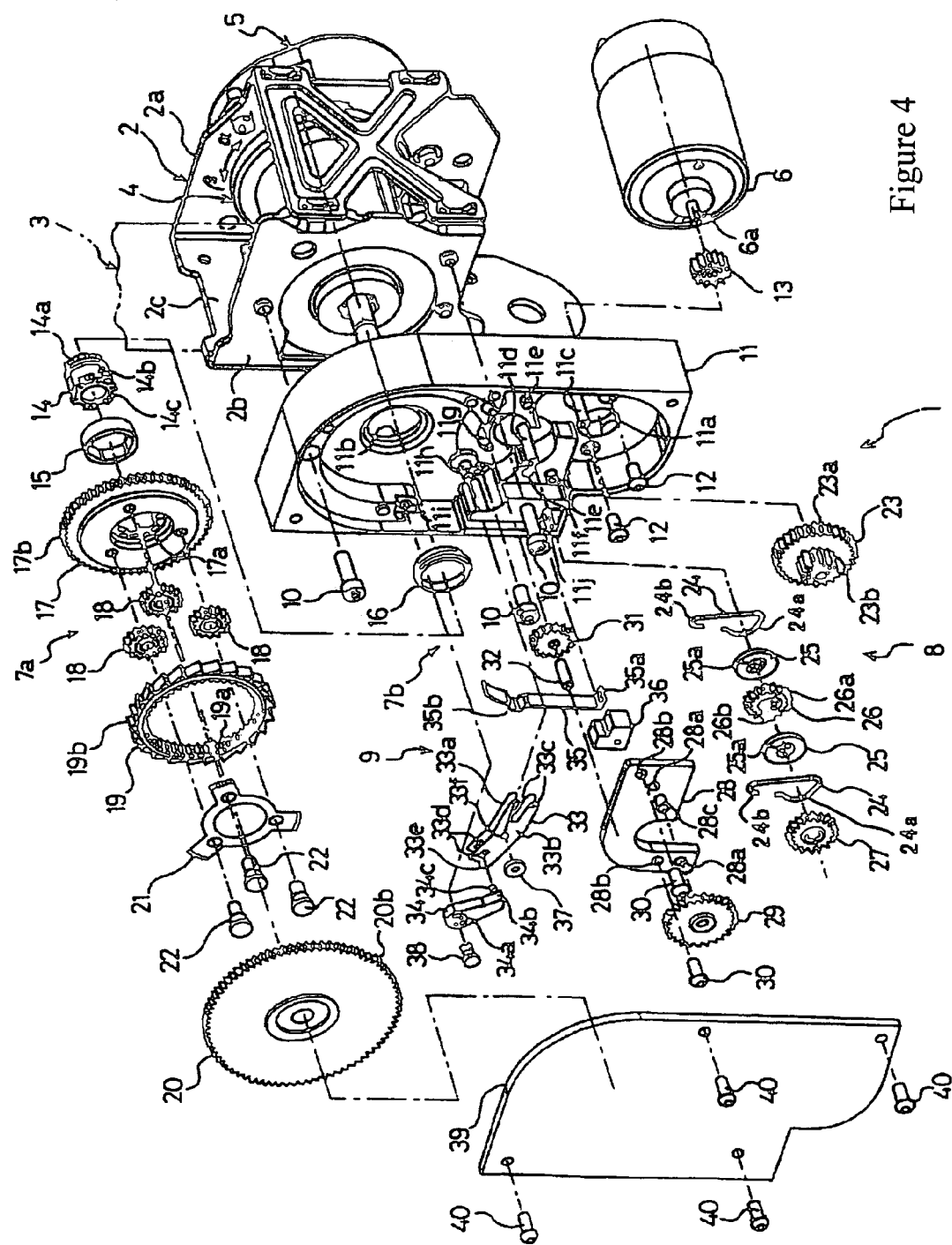
FIG. 4 is an exploded perspective view of a seat belt retractor of another embodiment.

As shown in FIG. 4, the seat belt retractor 1' of this embodiment generally comprises a frame 2, a seat belt 3 restraining the occupant when required, a spool 4 for winding up the seat belt 3, a locking mechanism 5 which is attached to one side of the frame 2 for preventing the spool 4 from rotating in the belt withdrawing direction a when large deceleration exceeding a predetermined deceleration value is generated such as in the event of vehicle collision, a single motor 6 for generating rotational torque to be applied to the spool 4, the power transmission mechanism 8, and the power transmission mode switching mechanism 9. The power transmission mechanism 8 has a high-ratio speed reduction mechanism 7a for transmitting the rotation of the motor 6 to the spool 4 after reducing the speed of the rotation at a relatively high reduction ratio and a low-ratio speed reduction mechanism 7b for transmitting the rotation of the motor 6 to the spool 4 after reducing the speed of the rotation at a relatively low reduction ratio. In the power transmission mechanism 8, a first power transmission path and a second power transmission path are set so that the power transmission mechanism 8 transmits the rotational torque of the motor 6 to the spool 4 selectively through either the first power transmission path or the second power transmission path. The power transmission mode switching mechanism 9 sets the power transmission mechanism 8 selectively into either the first power transmission path or the second power transmission path.

The power transmission mechanism 8 and the power transmission mode switching mechanism 9 are disposed between the motor 6 and the spool 4 and compose together a mechanism (so-called "clutch") for connecting and disconnecting the motor 6 and the spool 4. The power transmission mechanism 8 and the power transmission mode switching mechanism 9 correspond to the "motor speed-reduction mechanism for reducing the rotation of the motor via a plurality of gears" of embodiments of the present invention. The state where the motor 6 and the spool 4 are connected is a state where the power of the motor 6 is allowed to be transmitted to the spool 4. As the motor 6 is driven in this state, the power of the motor 6 is transmitted to the spool 4. When the motor 6 is stopped in this state, high resistance in the unwinding direction is applied to the spool 4 so that the unwinding (withdrawing) of the seat belt from the spool is restricted. On the other hand, in the state where the motor 6 is disconnected from the spool 4, the resistance in the unwinding direction applied to the spool 4 is reduced so as to allow the easy unwinding (withdrawing) of the seat belt 3 from the spool 4.

The frame 2 comprises a pair of parallel side walls 2a, 2b and a back plate 2c connecting the side walls 2a and 2b. Between the side walls 2a and 2b of the frame 2, the spool 4 for winding up the seat belt 3 is rotatably arranged. The spool 4 may be a conventionally well known spool for seat belt retractors. The spool 4 is adapted as a member for operating the winding and the unwinding of the seat belt 3 according to the driving of the single motor 6 and corresponds to the "spool" of embodiments of the present invention.

The locking mechanism 5 is attached to the side walls 2a. The locking mechanism 5 may be a conventionally well known locking mechanism for seat belt retractors. That is, the locking mechanism 5 is activated to prevent the spool 4 from rotating in the withdrawing direction α when a vehicle sensor (a deceleration sensor) detects a large deceleration exceeding a predetermined deceleration value applied to the vehicle or when a webbing sensor (belt withdrawing speed sensor) detects a withdrawing speed of the seat belt 3 exceeding a predetermined speed.

Between the spool 4 and the locking mechanism 5, a force limiter mechanism (an energy absorbing mechanism: hereinafter, referred to as "EA mechanism") (not shown), which is conventionally well known in the art, for limiting the load on the seat belt 3 when the withdrawal of the seat belt 3 is prevented by the actuation of the locking mechanism 5 is arranged. The EA mechanism may be composed, for example, of a conventionally well known torsion bar. In this case, when the withdrawal of the seat belt 3 is prevented by the actuation of the locking mechanism 5, the torsion bar is twisted and deformed so as to limit the load on the seat belt 3, thereby absorbing impact energy.

Figure 5A:
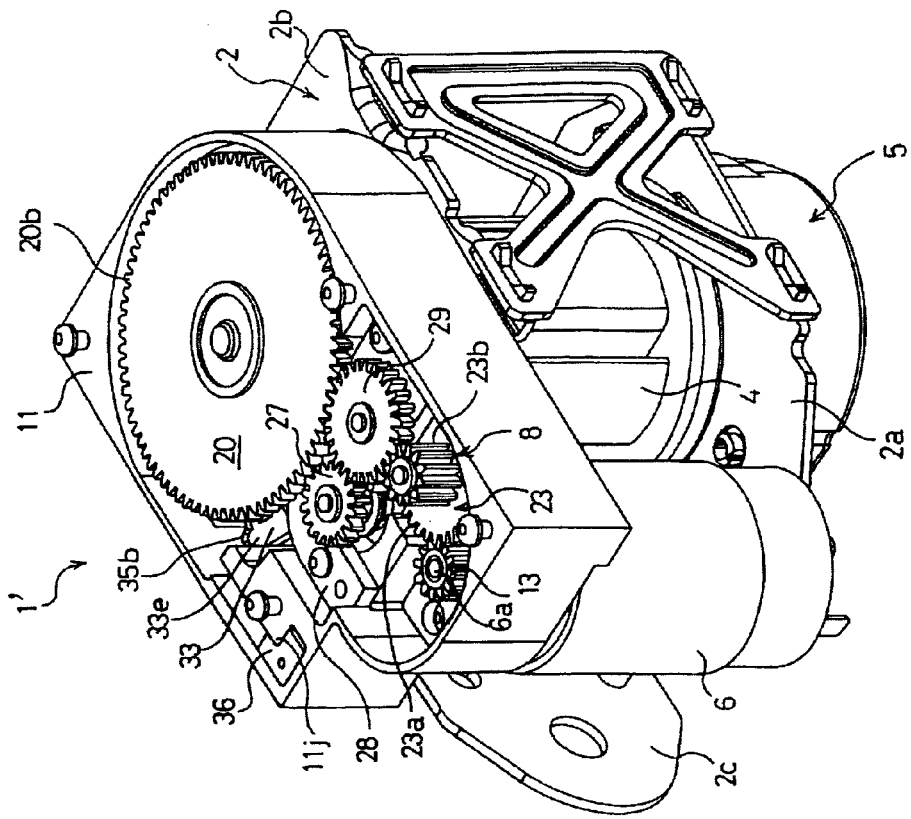

As shown in FIG. 4 and FIG. 5(a), a retainer 11 is mounted to the side wall 2b of the frame 2 by three screws 10 and the motor 6 is attached to the retainer 11 by a pair of screws 12 at a side which is fixed to the frame 2. A motor rotary shaft 6a of the motor 6 extends through a through hole 11a of the retainer 11. A motor gear 13 having external teeth is attached to the motor rotary shaft 6a projecting on the side opposite to the frame 2 side of the retainer 11 such that the motor gear 13 can rotate together with the motor rotary shaft 6a. The motor 6 is adapted as an electrically-operated motor arranged outside of the spool 4 and corresponds to the "electric motor" of embodiments of the present invention.

As shown in FIG. 4, between both the spool 4 and the aforementioned EA mechanism (for example, the torsion bar) and the speed reduction mechanisms 7a, 7b, a connector 14 for connecting these in the rotational direction is disposed. The connector 14 comprises a first rotational connecting portion 14a for connecting both the spool 4 and the EA mechanism in the rotational direction, a second rotational connecting portion 14b for connecting a connector-side bearing 15 in the rotational direction, and a third rotational connecting portion 14c which is formed with splines for connecting the speed reduction mechanisms 7a, 7b in the rotational direction.

The first rotational connecting portion 14a is formed into a polygonal cylindrical shape, but not clearly shown in FIG. 4. The outer periphery of the first rotational connecting portion 14a is connected to the spool 4 such that the first rotational connecting portion 14a can rotate together with the spool 4, while the inner periphery of the first rotational connecting portion 14a is connected to the EA mechanism (for example, the torsion bar) such that the first rotational connecting portion 14a can rotate together with the EA mechanism. Since the structure connecting the connector 14 with the spool 4 and the EA mechanism to rotate together is conventionally well known, the detailed description will be omitted.

The outer periphery of the second rotational connecting portion 14b is formed to have a polygonal section, while the inner periphery of the connector-side bearing 15 is formed to have a same polygonal section. The connector-side bearing 15 is fitted onto the second rotational connecting portion 14b, whereby the connector-side bearing 15 is attached to the connector 14 not to allow the relative rotation therebetween. A retainer-side bearing 16 is attached to an aperture 11b of the retainer 11 not to allow the relative rotation therebetween. The connector-side bearing 15 is supported by the retainer-side bearing 16 to allow the relative rotation, whereby the connector 14 is rotatably supported by the retainer 11.

The third rotational connecting portion 14c has a predetermined number of engaging grooves, such as splines, which extend in the axial direction and which are formed at equal intervals in the circumferential direction.

The high-ratio speed reduction mechanism 7a comprises an annular carrier gear 17, a predetermined number (three in the illustrative embodiment) of planet gears 18 which are rotatably attached to the carrier gear 17, a circular ring member 19, and a sun gear member 20.

The inner periphery 17a of the carrier gear 17 is provided, at its connector 14 side, with a predetermined number of engaging grooves, such as splines, which are formed at equal interval in the circumferential direction to extend in the axial direction. The engaging grooves of the inner periphery 17a are fitted to convexes between the engaging grooves of the third rotational connecting portion 14c of the connector 14 and convexes between the engaging grooves of the inner periphery 17a are fitted to the engaging grooves of the third rotational connecting portion 14c of the connector 14 (just like spline engagement), whereby the carrier gear 17 is connected to the connector 14 not to allow the relative rotation therebetween, i.e., to rotate together with the connector 14. The carrier gear 17 has external teeth 17b in the outer periphery thereof.

The planet gears 18 are rotatably attached to the carrier gear 17 via a speed reduction plate 21 by speed reduction pins 22.

The ring member 19 comprises an internal gear 19a formed in the inner periphery thereof and ratchet teeth 19b formed in the outer periphery thereof so that the internal gear 19a and the ratchet teeth 19b rotate together with each other.

Figure 6B:
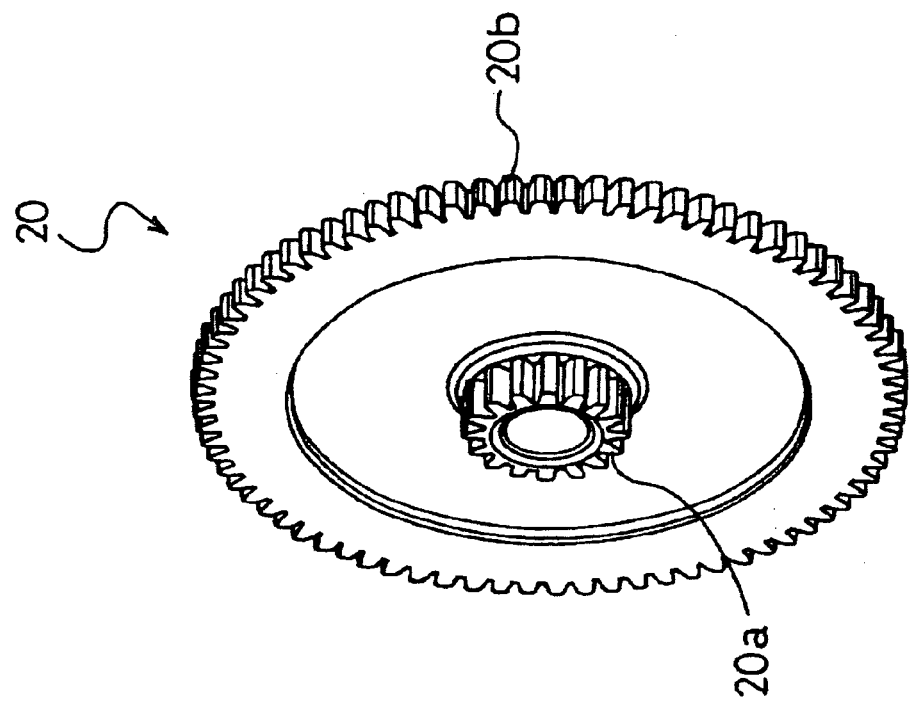
Figure 6A:
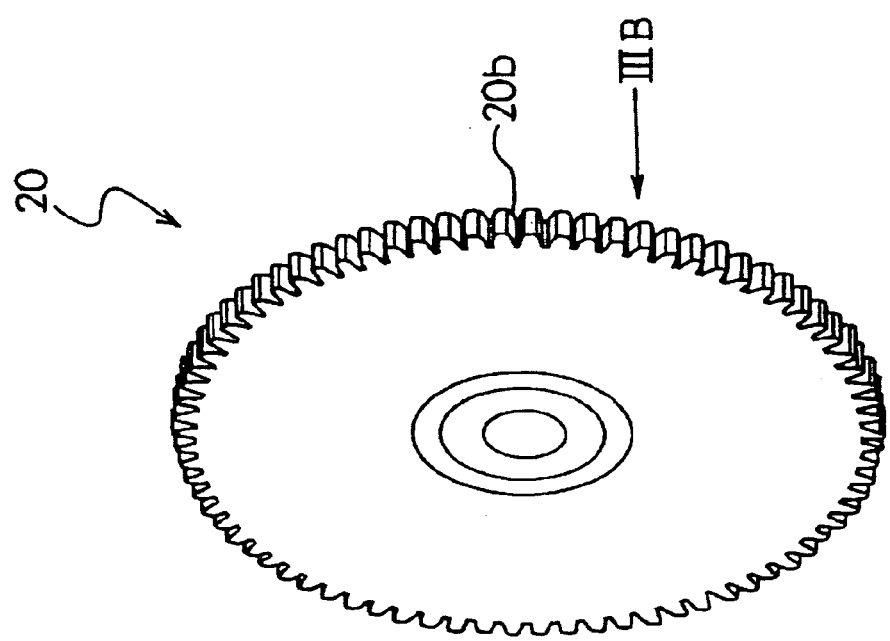

As shown in FIGS. 6(a) and 6(b), the sun gear member 20 comprises a sun gear 20a, composed of small-diameter external teeth, and large-diameter external teeth 20b so that the sun gear 20a and the external teeth 20b rotate together with each other.

The planet gears 18 supported by the carrier gear 17 always mesh with both the sun gear 20a and the internal gear 19a, thereby composing a planetary gear mechanism. Therefore, the speed reduction mechanism 7 is adapted as a planetary gear mechanism of which the input is defined by the sun gear 20a and the output is defined by the carrier gear 17.

As shown in FIG. 4, the power transmission mechanism 8 further comprises a connecting gear 23, a pair of clutch springs 24, a pair of pulleys 25, a lower-side connecting gear 26 having external teeth, an upper-side connecting gear 27 having external teeth, a guide plate 28, and an idle gear 29 having external teeth.

The connecting gear 23 is rotatably supported by a rotary shaft 11c projecting from the retainer 11 and comprises a first connecting gear 23a, composed of large-diameter external teeth, and a second connecting gear 23b, composed of small-diameter external teeth so that the first and second connecting gears 23a, 23b rotate together with each other. In this regard, as shown in FIGS. 5(a) and 5(b), the large-diameter first connecting gear 23a always meshes with the motor gear 13.

As shown in FIG. 4, the lower-side connecting gear 26 has rotary shafts 26a which are formed to project from the both side surfaces thereof (only one of the rotary shafts 26a is shown in FIG. 4) and a through hole 26b which is formed to axially extend through the rotary shafts 26a. Each rotary shaft 26a has flat portions so that an elongate hole 25a of each pulley 25 is fitted to the rotary shaft, whereby the elongate hole 25a partially extends along the faces of the flat portions. Therefore, the pulleys 25 are supported on the both side surfaces of the lower-side connecting gear 26, respectively, so that the pulleys 25 rotate together with the lower-side connecting gear 26. The clutch springs 24 each have a first curved engaging portion 24a which is engaged with each pulley 25. Further, the upper-side connecting gear 27 is supported on one rotary shaft 26a of the lower-side connecting gear 26 such that the upper-side connecting gear 27 rotates together with the lower-side connecting gear 26. The respective pulleys 25, the lower-side connecting gear 26, and the upper-side connecting gear 27 are rotatably supported by the rotary shaft 11d projecting from the retainer 11.

A pair of screws 30 are inserted into corresponding holes 28b of a guide plate 28 and are screwed into a pair of threaded holes 11f formed in the retainer 11 in a state that holes 28a of the guide plate 28 are fitted to and held by a pair of supporting shafts 11e projecting from the retainer 11, whereby the guide plate 28 is attached to the retainer 11. The idle gear 29 is rotatably supported on a rotary shaft 28c projecting from the guide plate 28.

Figure 5B:
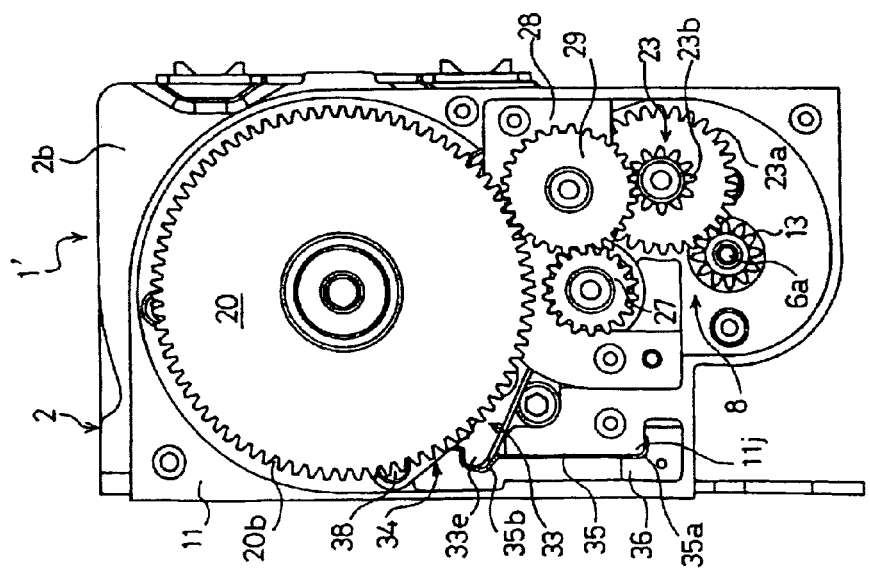

As shown in FIGS. 5(a) and 5(b), the idle gear 29 always mesh with the external teeth 20b of the sun gear member 20, the small-diameter second connecting gear 23b of the connecting gear 23, and the upper-side connecting gear 27.

The low-ratio speed reduction mechanism 7b comprises the upper-side connecting gear 27, the lower-side connecting gear 26, a clutch gear 31, and the carrier gear 17.

Therefore, the rotational torque of the motor 6 transmitted to the idle gear 29 is transmitted from the idle gear 29 to the spool 4 via the low-ratio speed reduction mechanism 7b or via the high-ratio speed reduction mechanism 7a.

As shown in FIG. 4, the power transmission mode switching mechanism 9 comprises the clutch gear 31 having external teeth, a rotary shaft 32, a clutch arm 33, a clutch pawl 34, a resistance spring 35, and a spring stopper 36.

Figure 8:
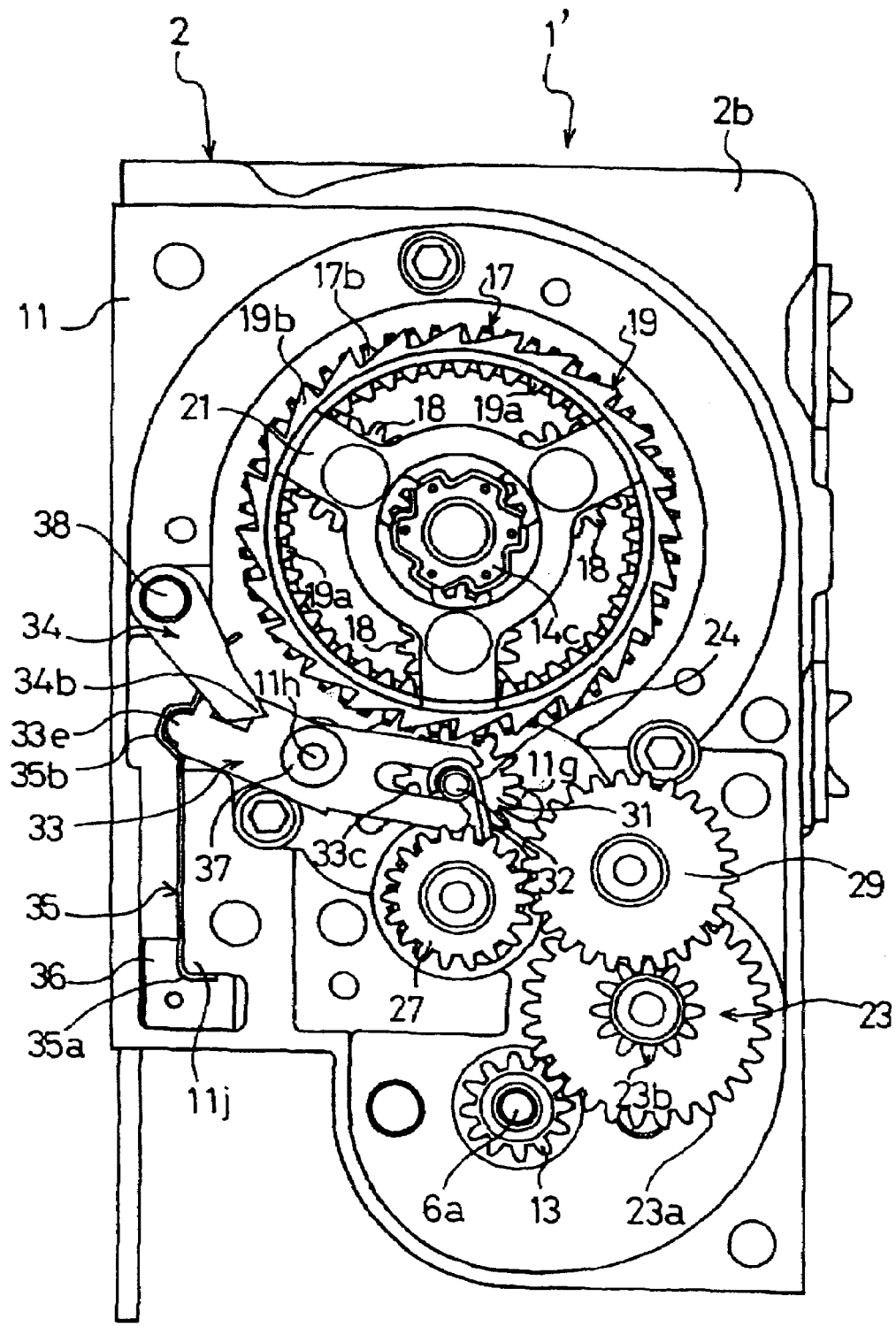
FIG. 8 is a left side view showing a state of the low reduction ratio power transmission mode of the seat belt retractor of the embodiment shown in FIG. 4 without showing some components.

As shown in FIG. 8, the clutch gear 31 can mesh with the external teeth 17b of the carrier gear 17 of which diameter is larger than that of the clutch gear 31 and always meshes with the lower-side connecting gear 26 (not shown). The rotary shaft 32 extends through a central hole 31a of the clutch gear 31 to rotatably support the clutch gear 31.

The clutch arm 33 is formed into a U shape in section, composed of side walls 33a, 33b and a bottom (not shown). At one end side, the both side walls 33a, 33b have projecting portions from the bottom and linear supporting grooves 33c which are formed in the projecting portions, respectively. The clutch gear 31 is disposed between the projecting portions of the side walls 33a and 33b so that the rotary shaft 32 projecting from the both sides of the clutch gear 31 is supported by the corresponding supporting grooves 33c in such a manner as to allow movement of the rotary shaft 32 along the supporting grooves 33c. Further, second curved engaging portions 24b of the clutch springs 24 are hooked onto the portions of the rotary shaft 32 projecting from the side walls 33a, 33b, respectively. One end of the rotary shaft 32 is fitted to and supported by a guide slot 11g formed in the retainer 11. The guide slot 11g is formed into a circular arc about the rotary shaft 11d. Therefore, the rotary shaft 32 is movable along a circumference of a circle about the rotary shaft 11d because the rotary shaft 32 is guided by the guide slot 11g.

At the other end side, the side walls 33a and 33b are provided with slots 33d and substantially circular engaging portions 33e, respectively. At the middle in the longitudinal direction, the side walls 33a, 33b are further provided with supporting holes 33f, respectively. The supporting holes 33f are fitted with a supporting shaft 11h projecting from the retainer 11, whereby the clutch arm 33 is pivotably supported. An E-ring 37 is attached to the supporting shaft 11h, thereby preventing the clutch arm 33 from coming off.

Figure 7:
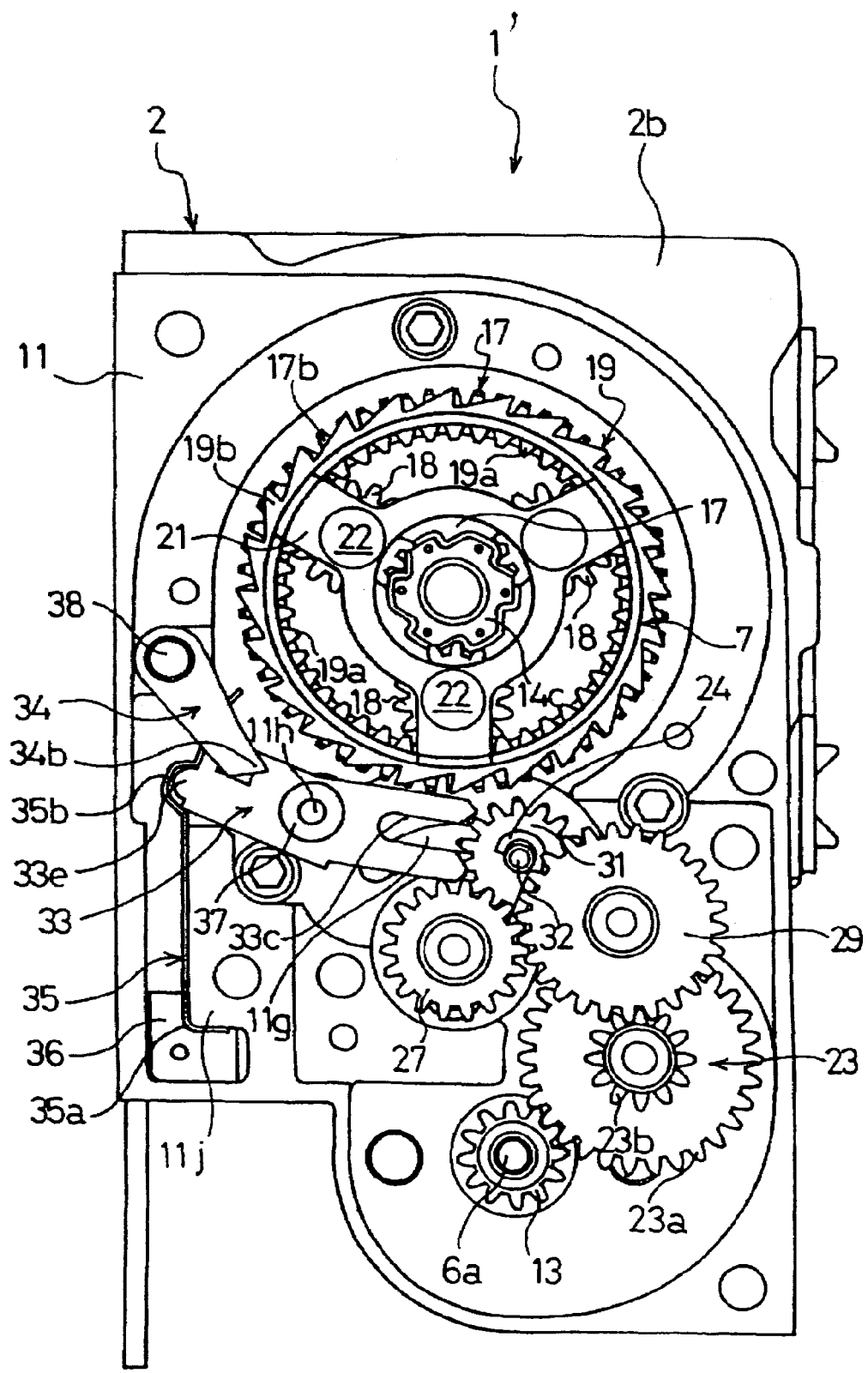
FIG. 7 is a left side view showing a state of the power transmission disconnection mode of the seat belt retractor of the embodiment shown in FIG. 4 without showing some components.
Figure 9:
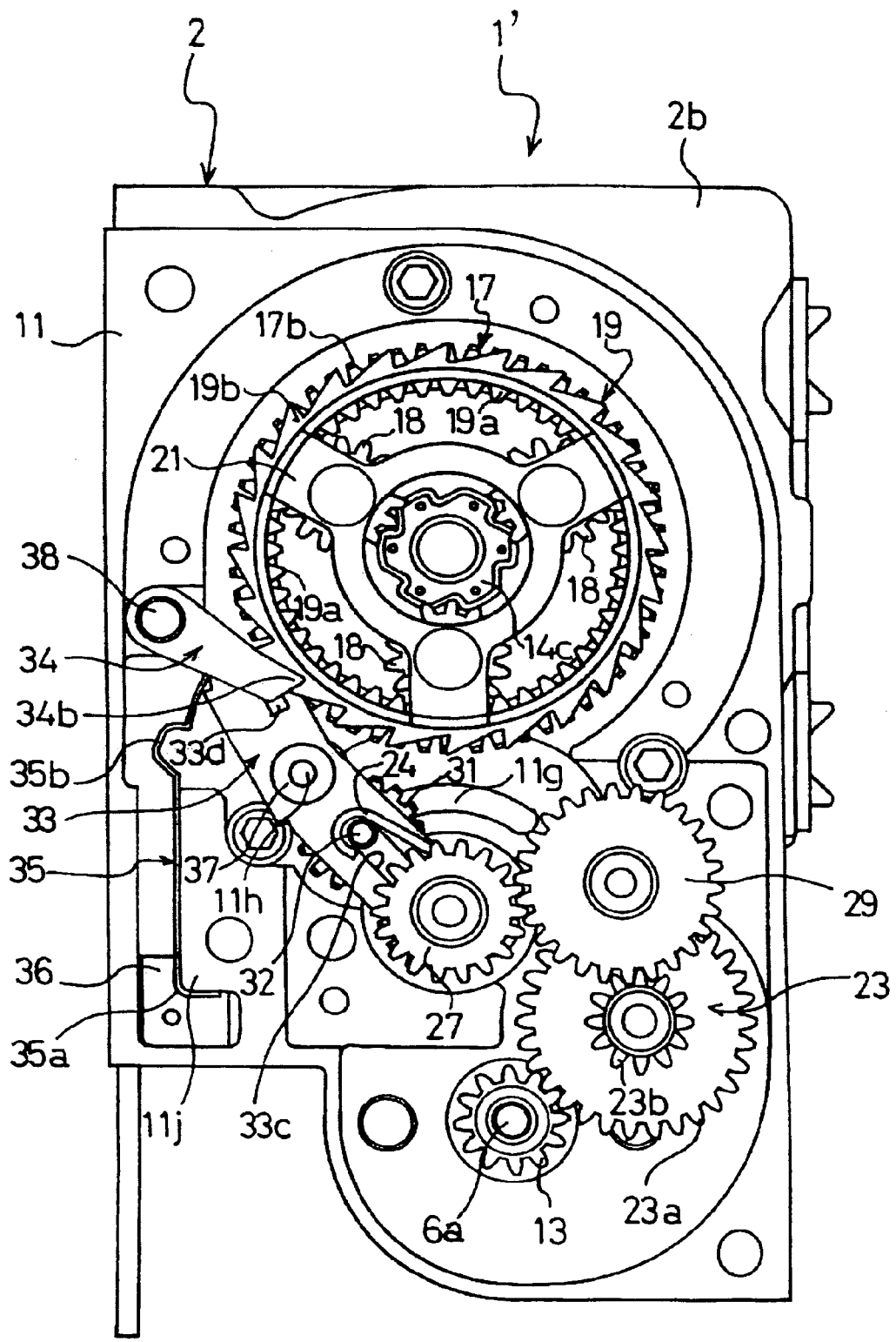
FIG. 9 is a left side view showing a state of the high reduction ratio power transmission mode of the seat belt retractor of the embodiment shown in FIG. 4 without showing some components.

The clutch pawl 34 is provided, at its one end, with a supporting hole 34a and at its other end, with an engaging pawl 34b. Furthermore, the other end of the clutch pawl 34, i.e., the engaging pawl 34b side, includes a connecting pin 34c projecting therefrom. The connecting pin 34c is fitted in the slots 33d of the clutch arm 33 to allow the rotation of the connecting pin 34c relative to the clutch arm 33 and allow the movement of the connecting pin 34c relative to the clutch arm 33 along the slots 33d. As shown in FIG. 7, a pawl pin 38 extends through the supporting hole 34a and is inserted into and connected with a pin hole 11i formed in the retainer 11, whereby the clutch pawl 34 is pivotally mounted to the retainer 11. As shown in FIG. 9, the engaging pawl 34b can engage ratchet teeth 19b when the ring member 19 rotates in the clockwise direction (corresponding to the belt-withdrawing direction α of the spool 4). When the engaging pawl 34b engages one of the ratchet teeth 19b, the rotation of the ring member 19 in the clockwise direction is stopped.

The resistance spring 35 is composed of a band-like plate spring, and has a lower end formed in an L-like shape as a supporting portion 35a and a recess 35b formed in a U-like shape at a middle-upper portion in the longitudinal direction. A portion between the recess 35b and the supporting portion 35a is flat and a portion between the recess 35b and the upper end is curved.

The recess 35b can receive the engaging portion 33e of the clutch arm 33. As shown in FIG. 7, in a state that the engaging portion 33e is received by the recess 35b, the supporting grooves 33c extend in a tangential direction relative to the arc of the guide slot 11g so that the rotary shaft 32 can move from the guide slot 11g to the supporting grooves 33c or from the supporting grooves 33c to the guide slot 11g.

The spring stopper 36 is formed in an L-like shape and the supporting portion 35a is held between the spring stopper 36 and a spring mounting portion 11j formed on the retainer 11, whereby the resistance spring 35 is mounted to the retainer 11 in a cantilever-like manner with the upper end as a free end.

The respective components of the speed reducing mechanism 7, the power transmission mechanism 8 and the power transmission mode switching mechanism 9 are mounted within recesses formed in the face of the retainer 11 opposite to the face fixed to the frame 2, and a retainer cover 39 is attached to the retainer 11 on this face side with a predetermined number (four in the drawings) of screws 40 to cover the components.

The power transmission mechanism 8 and the power transmission mode switching mechanism 9 having the aforementioned structures are controlled by the ECU 78 to switch among the following three power transmission modes. The three power transmission modes will now be described with reference to FIG. 7 through FIG. 9. FIG. 7 is a left side view showing a state of power transmission disconnection mode of the seat belt retractor 1' of the embodiment shown in FIG. 4 without showing some components. FIG. 8 is a left side view showing a state of low reduction ratio power transmission mode of the seat belt retractor 1' of the embodiment shown in FIG. 4 without showing some components. FIG. 9 is a left side view showing a state of high reduction ratio power transmission mode of the seat belt retractor 1' of the embodiment shown in FIG. 4 without showing some components.

(1) Power Transmission Disconnection Mode (Free Mode)

As shown in FIG. 7, in the power transmission disconnection mode, the engaging portion 33e of the clutch arm 33 for the power transmission mode switching mechanism 9 is received by the recess 35b of the resistance spring 35. In the state that the engaging portion 33e is received by the recess 35b, the engaging pawl 34b of the clutch pawl 34 does not engage the ratchet teeth 19b of the ring member 19 so as to allow free rotation of the ring member 19. Accordingly, the torque transmission path (low speed and high torque transmission path as will be described later) between the sun gear member 20 and the carrier gear 17 is disconnected.

On the other hand, the rotary shaft 32 is in contact with the right end of the guide slot 11g so as to set the clutch gear 31 to the rightmost position. At the rightmost position, the clutch gear 31 is spaced away from the external teeth 17b of the carrier gear 17. Accordingly, the torque transmission path (high-speed and low-torque transmission path as will be described later) between the clutch gear 31 and the carrier gear 17 is disconnected.

As a result, in the power transmission disconnection mode, the spool 4 and the motor 6 are not connected so that the rotational torque of the motor 6 is not transmitted to the spool 4 and the rotational torque of the spool 4 is also not transmitted to the motor 6. That is, the power transmission disconnection mode is defined as a state that the mechanical connection between the spool 4 and the power transmission mechanism 8 is canceled (This state corresponds to "the disconnected state of the power transmission mechanism" of embodiments of the present invention. On the other hand, the state that the spool 4 and the power transmission mechanism 8 are connected corresponds to "the connected state of the power transmission mechanism" of embodiments of the present invention.). In this state, the spool 4 is completely disconnected from the power transmission mechanism 8 side (the motor 6 side) so that the resistance in the unwinding direction applied to the spool 4 by the power transmission mechanism 8 is reduced, thereby allowing easy rotation of the spool 4. Regardless of the driving of the motor 6, the seat belt 3 can be easily withdrawn from the spool 4.

(2) Low Reduction Ratio Power Transmission Mode

As shown in FIG. 8, in the low reduction ratio power transmission mode, the engaging portion 33e of the clutch arm 33 is received by the recess 35b of the resistance spring 35 similarly to the power transmission disconnection mode. In the state that the engaging portion 33e is received by the recess 35b, the engaging pawl 34b of the clutch pawl 34 does not engages the ratchet teeth 19b of the ring member 19 so as to allow free rotation of the ring member 19. Accordingly, the low speed and high torque transmission path between the sun gear member 20 and the carrier gear 17 is disconnected.

On the other hand, the rotary shaft 32 is set at the uppermost position (closest to the rotary shaft of the spool 4) at the middle portion of the guide slot 11g so as to set the clutch gear 31 to the uppermost position (closest to the rotary shaft of the spool 4). At the uppermost position, the clutch gear 31 meshes with the external teeth 17b of the carrier gear 17. Accordingly, the high-speed and low-torque transmission path between the clutch gear 31 and the carrier gear 17 is connected. That is, the motor 6 is connected to the spool 4 through the motor gear 13, the connecting gear 23, the idle gear 29, the upper-side connecting gear 27, the lower-side connecting gear 26, the clutch gear 31, the carrier gear 17, and the connector 14. Therefore, the low reduction ratio power transmission path is set. The rotary shaft 32 at the uppermost position is inserted into the supporting grooves 33c of the clutch arm 33 so as to come in contact with the clutch arm 33.

As described above, the low reduction ratio power transmission mode is a power transmission mode for power transmission with a low reduction ratio and in which the high-speed and low-torque transmission path is set. In the low reduction ratio power transmission mode, it is possible to quickly retract the seat belt by the motor 6. The low reduction ratio power transmission mode and the high reduction ratio power transmission mode as will be described later are defined as a state that the spool 4 and the power transmission mechanism 8 are mechanically connected so as to allow the transmission of the power of the motor 6 to the spool 4 via the power transmission mechanism 8.

When the motor 6 is driven and the power transmission mechanism 8 is set in the low reduction ratio power transmission mode or the high reduction ratio power transmission mode as will be described later, the power of the motor 6 is transmitted to the spool 4 via the power transmission mechanism 8. When the motor 6 is not driven and the power transmission mechanism 8 is set in the low reduction ratio power transmission mode or the high reduction ratio power transmission mode as will be described later, large resistance in the unwinding direction is applied to the spool 4 by the power transmission mechanism 8 which is mechanically connected to the spool 4 so that the seat belt 3 is hardly unwound (withdrawn) from the spool 4 or the seat belt 3 is not allowed to be unwound (withdrawn) from the spool 4.

(3) High Reduction Ratio Power Transmission Mode

As shown in FIG. 9, in the high reduction ratio power transmission mode, the engaging portion 33e of the clutch arm 33 disengages from the recess 35b of the resistance spring 35 and is set at the curve portion of the resistance spring 35 on the upper side of the recess 35b. In the state that the engaging portion 33e disengages from the recess 35b, the engaging pawl 34b of the clutch pawl 34 engages one of the ratchet teeth 19b of the ring member 19 so as to stop the ring member 19 from rotation in the clockwise direction. Accordingly, the low speed and high torque transmission path between the sun gear member 20 and the carrier gear 17 is connected. That is, the motor 6 is connected to the spool 4 through the motor gear 13, the connecting gear 23, the idle gear 29, the external teeth 20b of the sun gear member 20, the sun gear 20a, the planetary gears 18, the carrier gear 17, and the connector 14. As a result, the high reduction ratio power transmission path by the planetary gear mechanism is set.

On the other had, the rotary shaft 32 is in contact with the left end of the guide slot 11g so as to set the clutch gear 31 to the leftmost position. At the leftmost position, the clutch gear 31 disengages from the external teeth 17b of the carrier gear 17. Accordingly, the high speed and low torque transmission path between the clutch gear 31 and the carrier gear 17 is disconnected.

The high reduction ratio power transmission mode is a power transmission mode for the power transmission with a high reduction ratio and in which the low speed and high torque transmission path is set. In the high reduction ratio power transmission mode, the seat belt is retracted with high tension by the motor 6.

The power transmission mode switching mechanism 9 conducts the power transmission mode switching among the power transmission disconnection mode, the low reduction ratio power transmission mode, and the high reduction ratio power transmission mode. The mode switching is conducted according to, for example, the following three styles of behavior.

(1) Switching from the Power Transmission Disconnection Mode to the Low Reduction Ratio Power Transmission Mode As the motor 6 rotates in the normal direction (the motor rotary shaft 6a rotates in the clockwise direction in FIG. 7: corresponding to rotation of the spool 4 in the belt winding direction (the direction β in FIG. 4)) in the power transmission disconnection mode shown in FIG. 7, the lower-side connecting gear 26 and the pulleys 25 are rotated in the respective directions corresponding to the belt winding direction β of the spool 4 via the motor gear 13, the connecting gear 23, the idle gear 29, and the upper-side connecting gear 27. Then, the clutch gear 31 rotates freely because the clutch gear 31 does not mesh with the external teeth 17b of the carrier gear 17. In this state, the rotary shaft 32 is free from any resistance so that the clutch spring 24 rotates in the same direction as the pulleys 25. Accordingly, the clutch gear 31 and the rotary shaft 32 move to the left along the guide slot 11g so that the rotary shaft 32 comes in contact with the clutch arm 33 as shown in FIG. 8.

In the state that the rotary shaft 32 is in contact with the clutch arm 33, the clutch gear 31 and the rotary shaft 32 are set to the uppermost positions as shown in FIG. 8 and the clutch gear 31 meshes with the external teeth 17b of the carrier gear 17. Accordingly, rotation of the clutch gear 31 is transmitted to the carrier gear 17, whereby the carrier gear 17 is rotated. If the seat belt 3 has slack in this sate, the seat belt 3 is wound onto the spool 4 by the rotation of the carrier gear 17. As the slack is removed, the spool 4 no longer rotates so that the carrier gear 17 no longer rotates. Therefore, the clutch gear 31 receives resistance from the carrier gear 17 so that the clutch gear 31 also no longer rotates.

On the other hand, the lower-side connecting gear 26 is forced to rotate due to rotational torque of the motor 6. Because of the rotational torque of the lower-side connecting gear 26, force is applied to the rotary shaft 32 in a direction toward the leftmost position. Since the rotary shaft 32 is in contact with the clutch arm 33, the clutch arm 33 is pressed by the rotary shaft 32. Since, however, the seat belt 3 is tightened with tension less than a predetermined value, the moment for rotating the clutch arm 33 in the clockwise direction due to pressing force applied by the rotary shaft 32 is smaller than the moment for preventing rotation of the clutch arm 33 in the clockwise direction due to the engagement between the engaging portion 33e and the recess 35b. Accordingly, the engaging portion 33e does not disengage from the recess 35b, the clutch arm 33 does not rotate, and the rotary shaft 32 is stopped at the position where the rotary shaft 32 is in contact with the clutch arm 33.

Since the rotary shaft 32 is stopped, the clutch gear 31 and the rotary shaft 32 are held at the aforementioned uppermost position as shown in FIG. 8. Since the clutch gear 31 is held at the uppermost position, the mesh between the clutch gear 31 and the external teeth 17b of the carrier gear 17 is maintained and connection of the high speed and low torque transmission path between the clutch gear 31 and the carrier gear 17 is maintained. Since the clutch arm 33 does not rotate, the clutch pawl 34 does not pivot, thereby holding the engaging pawl 34b at a position where the engaging pawl 34b does not engage the ratchet teeth 19b. As a result, the ring member 19 rotates freely, thereby maintaining the disconnection of the low speed and high torque transmission path between the sun gear member 20 and the carrier gear 17.

In this manner, the mode of the power transmission mechanism 8 is switched from the power transmission disconnection mode to the low reduction ratio power transmission mode, whereby the power transmission mechanism 8 is set to the low reduction ratio power transmission mode.

(2) Switching from the Low Reduction Ratio Power Transmission Mode to the High Reduction Ratio Power Transmission Mode The high reduction ratio power transmission mode is set by relatively high rotational torque of the motor 6. In this case, the power transmission mode is switched from the power transmission disconnection mode to the high reduction ratio power transmission mode through the low reduction ratio power transmission mode.

Switching from the power transmission disconnection mode to the low reduction ratio power transmission mode is performed in the same way as described above. However, when the mode is set to the high reduction ratio power transmission mode, the tension of the seat belt 3 is greater than the predetermined value. Accordingly, the moment applied to the clutch arm 33 due to the pressing force from the rotary shaft 32 in the low reduction ratio power transmission mode shown in FIG. 8 is greater than the moment for preventing rotation of the clutch arm 33 in the clockwise direction due to engagement between the engaging portion 33e and the recess 35b. As a result, the engaging portion 33e can disengage from the recess 35b.

When the clutch springs 24 further rotate in the counter-clockwise direction, the rotary shaft 32 moves toward the left along the guide slot 11g while rotating the clutch arm 33 in the clockwise direction about the supporting shaft 11h. Accordingly, the clutch gear 31 also further moves toward the left. As the rotary shaft 32 comes in contact with the left end of the guide slot 11g, further movement of the rotary shaft 32 is prevented so that the clutch gear 31, the rotary shaft 32, and the clutch springs 24 are stopped. Accordingly, as shown in FIG. 9, the clutch gear 31 and the rotary shaft 32 are set to the leftmost positions. At the leftmost positions, the clutch gear 31 comes off the external teeth 17b of the carrier gear 17 and the high speed and low torque transmission path between the clutch gear 31 and the carrier gear 17 is thus disconnected.

On the other hand, the clutch pawl 34 pivots about the clutch pawl pin 38 in the counter-clockwise direction along with the rotation of the clutch arm 33, and the engaging pawl 34b is set to a position capable of engaging the ratchet teeth 19b as shown in FIG. 9. Since the sun gear member 20 rotates by rotational torque of the motor 6 and the ring member 19 rotates in the clockwise direction, one of the ratchet teeth 19b engages the engaging pawl 34b. Accordingly, the rotation of the ring member 19 is stopped, whereby the low speed and high torque transmission path between the sun gear member 20 and the carrier gear 17 is connected.

In this manner, the mode of the power transmission mechanism 8 is switched from the low reduction ratio power transmission mode to the high reduction ratio power transmission mode, whereby the power transmission mechanism 8 is set to the high reduction ratio power transmission mode.

(3) Switching from the High Reduction Ratio Power Transmission Mode to the Power Transmission Disconnection Mode (Through the Low Reduction Ratio Power Transmission Mode)

As the motor 6 rotates in the reverse direction (the motor rotary shaft 6a rotates in the counterclockwise direction in FIG. 7: corresponding to rotation of the spool 4 in the belt-withdrawing direction (the direction α in FIG. 4)) in the high reduction ratio power transmission mode shown in FIG. 9, the lower-side connecting gear 26 and the pulleys 25 rotate in the direction opposite to the aforementioned direction. Then, the clutch springs 24 also rotate in the direction opposite to the aforementioned direction so that the clutch gear 31 and the rotary shaft 32 move to the right along the guide slot 11g while rotating the clutch arm 33 in the counterclockwise direction.

Since the clutch pawl 34 pivots in the clockwise direction along with the counter-clockwise rotation of the clutch arm 33, the clutch pawl 34 is positioned at the disengaging position not allowing the engagement of the clutch pawl 34 with the ratchet teeth 19b. Accordingly, the ring member 19 rotates freely, thereby disconnecting the low speed and high torque transmission path.

When the clutch gear 31 and the rotary shaft 32 reach the aforementioned uppermost position, the clutch gear 31 meshes with the external teeth 17b of the carrier gear 17 so that the power transmission mechanism 8 temporarily becomes the low reduction ratio power transmission mode shown in FIG. 8. Since the rightward movement of the clutch gear 31 and the rotary shaft 32 continues, however, the clutch gear 31 immediately comes off the external teeth 17b so that the clutch gear 31 idles away. Accordingly the high speed and low torque transmission path is temporarily connected and then immediately disconnected. When the high speed and low torque transmission path is connected temporarily, the motor 6 rotates in the reverse direction, and the spool 4 temporarily rotates in the belt-withdrawing direction α and stops soon.

As the rotary shaft 32 comes in contact with the right end of the guide slot 11g, further movement of the rotary shaft 32 is prevented so that the clutch gear 31, the rotary shaft 32, and the clutch springs 24 are stopped. The clutch gear 31 and the rotary shaft 32 are set to the rightmost positions shown in FIG. 7 as described in the above.

In this manner, the mode of the power transmission mechanism 8 is switched from the high reduction ratio power transmission mode to the power transmission disconnection mode, whereby the power transmission mechanism 8 is set to the power transmission disconnection mode.

In this embodiment, the mode of the power transmission mechanism 8 is switched by the control of the rotation of the motor 6.

Specifically with regard to the low reduction ratio power transmission mode, the mode is switched from the power transmission disconnection mode to the low reduction ratio power transmission mode and the low reduction ratio power transmission mode is continued when the motor 6 is controlled to rotate in the normal direction, while the mode is switched from the low reduction ratio power transmission mode to the power transmission disconnection mode so as to cancel the low reduction ratio power transmission mode when the motor 6 is controlled to rotate in the reverse direction. As, at this point, the motor 6 is controlled to rotate in the reverse direction to switch from the connected state (the low reduction ratio power transmission mode) to the disconnected state (the power transmission disconnection mode) of the power transmission mechanism 8, the power transmission mechanism 8 is switched from the connected state (the low reduction ratio power transmission mode) to the disconnected state (the power transmission disconnection mode) because of difference in rotational speed between the spool 4 and the motor 6.

With regard to the high reduction ratio power transmission mode, the mode is switched from the low reduction ratio power transmission mode to the high reduction ratio power transmission mode and the high reduction ratio power transmission mode is continued when the motor 6 is controlled to rotate in the reverse direction, while the mode is switched from the high reduction ratio power transmission mode to the low reduction ratio power transmission mode so as to cancel the high reduction ratio power transmission mode when the motor 6 is controlled to rotate in the normal direction.

In the seat belt apparatus 100, the motor driving control in the seat belt retractor 1 of the first embodiment or the seat belt retractor 1' of the second embodiment is carried out by the ECU 78 based on input signals from the input element 80 as shown in FIG. 1 in order to perform restraint of the vehicle occupant or to cancel the restraint of the vehicle occupant.

That is, the ECU 78 controls the driving of the motor to control the tension on the seat belt 3 based on the input signal from the input element 80, so the seat belt apparatus 100 of this embodiment has a function of controlling the restraint condition of the vehicle occupant and composes "vehicle restraint system" of a vehicle. In this embodiment, the following seven specific seat belt setting modes can be set with regard to the state of the seat belt 3. The control of the seat belt retractor by the ECU 78 can be performed according to the seat belt setting mode which is previously set.

(1) Seat Belt Winding and Storing Mode

Seat belt winding and storing mode is a setting mode in which when the tongue (the tongue 72 in FIG. 1) is released from the buckle and the buckle switch (the buckle switch 76a in FIG. 1) is turned OFF, the seat belt 3 is fully wound so as to make the seat belt 3 in the storage state.

In case of the seat belt retractor 1 of the first embodiment, in the seat belt winding and storing mode, the motor 53 is controlled to drive in the belt winding direction so as to rapidly wind up the withdrawn seat belt 3 onto the spool 52. Then, the motor 53 is stopped when a predetermined belt tension which is very weak is developed at the completion of the winding of the seat belt 3. Accordingly, the seat belt 3 becomes to belt storage mode in which very weak belt tension is applied to the seat belt 3.

In case of the seat belt retractor 1' of the second embodiment, in the seat belt winding and storing mode, the motor 6 is driven with relatively weak rotational torque in the belt winding direction and the power transmission mechanism 8 is set to the low reduction ratio power transmission mode. Accordingly, the withdrawn seat belt 3 is promptly wound with low torque. Thus, the seat belt 3 is fully wound and the motor 6 is stopped when a predetermined belt tension which is very weak is developed, whereby the seat belt 3 becomes to the belt storage mode in which the very weak belt tension is applied to the seat belt 3.

(2) Seat Belt Withdrawing and Using Mode

Seat belt withdrawing and using mode is a setting mode in which the seat belt 3 is withdrawn from the spool 4 so as to allow the occupant to wear the seat belt 3.

In case of the seat belt retractor 1 of the first embodiment, in the seat belt withdrawing and using mode, the motor 53 is controlled to drive in the belt unwinding direction to facilitate the vehicle occupant to catch the seat belt 3 or the tongue 72 during the operation of inserting the tongue 72 into the buckle 76 by the vehicle occupant. This enables the reduction of load and action for the operation of wearing the seat belt.

In case of the seat belt retractor 1' of the second embodiment, in the seat belt withdrawing and using mode, the motor 6 is controlled to drive in the belt unwinding direction and, in addition, the power transmission mechanism 8 is set in the low reduction ratio power transmission mode to facilitate the vehicle occupant to catch the seat belt 3 or the tongue 72. This enables the reduction of load and action for the operation of wearing the seat belt.

(3) Seat Belt Winding and Fitting Mode

Seat belt winding and fitting mode is a setting mode in which after the seat belt 3 is withdrawn and the tongue (the tongue 72 in FIG. 1) is inserted into and latched with the buckle to turn ON the buckle switch (the buckle switch 76a in FIG. 1), excessively withdrawn part of the seat belt 3 is wound in order to fit the seat belt 3 to the occupant and a setting mode in which when the occupant moves so as to withdraw a predetermined amount of the seat belt 3 from the normally used state of the seat belt 3 (at this point, the buckle switch is in the ON state) and then the occupant returns to the original position, the withdrawn part of the seat belt 3 is wound.

In case of the seat belt retractor 1 of the first embodiment, in the seat belt winding and fitting mode, the motor 53 of the seat belt retractor 1 is driven to rotate in the belt winding direction so that a predetermined tension acts on the seat belt 3. Therefore, the seat belt 3 is worn by the vehicle occupant in a state that the seat belt 3 fits the vehicle occupant. Accordingly, the slack of the seat belt which is produced when the seat belt 3 is withdrawn is removed. If desired, the driving of the motor 53 may be controlled finely to rotate in the belt winding direction or the belt unwinding direction so as to adjust the feeling of fitting during wearing of the seat belt.

In case of the seat belt retractor 1' of the second embodiment, in the seat belt winding and fitting mode, the motor 6 is driven to rotate in the belt winding direction and the power transmission mechanism 8 is set in the low reduction ratio power transmission mode. Therefore, the motor 6 is stopped when very small predetermined belt tension is generated after the seat belt 3 is rapidly wound with low torque, whereby the seat belt 3 is worn by the vehicle occupant in a state that the seat belt 3 fits the vehicle occupant. Accordingly, the slack of the seat belt which is produced when the seat belt 3 is withdrawn is removed. If desired, the driving of the motor 6 may be controlled finely to rotate in the belt winding direction or the belt unwinding direction so as to adjust the feeling of fitting during wearing of the seat belt.

(4) Normal Wearing Mode (Comfortable Mode)

Normal wearing mode (comfortable mode) is a setting mode in which the occupant wears the seat belt in the normal state after the belt winding and fitting mode is terminated.

In case of the seat belt retractor 1 of the first embodiment, in the normal wearing mode, the motor 53 is controlled to apply very weak tension on the seat belt 3. Therefore, the vehicle occupant can wear the seat belt 3 without any stress.

In case of the seat belt retractor 1' of the second embodiment, in the normal wearing mode, the motor 6 is controlled to apply very weak tension on the seat belt 3 in a state the power transmission mechanism 8 is set in the low reduction ratio power transmission mode. Therefore, the vehicle occupant can wear the seat belt 3 without any stress.

(5) Warning Mode (Informing Mode)

Warning mode is a setting mode in which when an obstacle around the vehicle or dozing of the driver is detected during running, the seat belt 3 is wound repeatedly predetermined times so as to warn the driver.

In case of the seat belt retractor 1 of the first embodiment, in the warning mode, the motor 53 is driven repeatedly to rotate in the belt winding direction and the belt unwinding direction when it is determined that an obstacle (another vehicle, object, pedestrian or the like) exists within a predetermined range around the vehicle, when it is determined that the vehicle is highly likely to collide with the obstacle, or when it is determined that the driver dozes. Therefore, the operation of applying relatively strong belt tension (which is weaker than that of the belt tension during the emergency mode as will be described later) and very weak belt tension onto the seat belt 3 is repeated, thereby drawing the driver's attention to the obstacle around the vehicle or the dozing.

In case of the seat belt retractor 1' of the second embodiment, in the warning mode, the motor 6 is controlled to be driven repeatedly to rotate in the belt winding direction and the belt unwinding direction in the state the power transmission mechanism 8 is set in the low reduction ratio power transmission mode.

The warning mode is a setting mode in which when the seat belt is worn, the motor is controlled to drive in the belt winding direction to apply a first tension to the seat belt 3 before a vehicle collision and corresponds to the "first setting mode" of embodiments of the present invention.

(6) Pre-Collision Restraint Mode

Pre-collision restraint mode is a setting mode which is set when there is an extremely big risk that the vehicle will collide with an obstacle or the like (it is determined that a vehicle collision is unavoidable) during running in the normal wearing mode or following the aforementioned warning mode.

In case of the seat belt retractor 1 of the first embodiment, in the pre-collision restraint mode, the motor 53 is controlled to drive in the belt winding direction so that relatively large tension acts on the seat belt 3 when the seat belt 3 is in the worn state. Therefore, it is possible to restraint the vehicle occupant from changing his or her posture due to emergency braking or the like.

In case of the seat belt retractor 1', of the second embodiment, in the pre-collision restraint mode, the motor 6 is controlled to drive in the belt winding direction so that relatively large tension acts on the seat belt 3 when the seat belt 3 is in the worn state and the power transmission mechanism 8 is set in the low reduction ratio power transmission mode. Therefore, it is possible to restraint the vehicle occupant from changing his or her posture due to emergency braking or the like.

The pre-collision restraint mode is a setting mode in which when the seat belt is worn, the motor is controlled to drive in the belt winding direction to apply a first tension to the seat belt 3 before a vehicle collision and corresponds to the "first setting mode" of embodiments of the present invention.

(7) In-collision Restraint Mode

In-collision restraint mode is a setting mode which is set when the vehicle actually collides with an obstacle or the like during running.

In case of the seat belt retractor 1 of the first embodiment, in the in-collision restraint mode, the motor 53 is controlled to drive in the belt winding direction to apply tension, which is larger (higher) than that in the warning mode and that in the pre-collision restraint mode, to the seat belt 3 in the worn state. As a result, initial restraint for restraining the occupant from changing his or her posture at the initial state of the vehicle collision is reliably achieved.

In case of the seat belt retractor 1' of the second embodiment, in the in-collision restraint mode, the motor 6 is controlled to drive in the belt winding direction to apply tension, which is larger (higher) than that in the warning mode and that in the pre-collision restraint mode, to the seat belt 3 in the worn state when the power transmission mechanism 8 is set in the high reduction ratio power transmission mode. As a result, the seat belt 3 is wound with high torque so that the occupant is restrained by the seat belt 3 with extremely large tension.

The in-collision restraint mode is a setting mode in which the motor is controlled to drive in the belt winding direction to apply a second tension to the seat belt 3 in the worn state during the actual vehicle collision and corresponds to the "second setting mode" of embodiments of the present invention.

With regard to the control of the seat belt retractor 1 having the aforementioned structure, detailed actions in the warning mode, the pre-collision restraint mode, and the in-collision restraint mode will be specifically described with reference to FIG. 10 and FIG. 11. The control in the seat belt retractor 1 is conducted by the ECU 78 as shown in FIG. 1.

Figure 10:
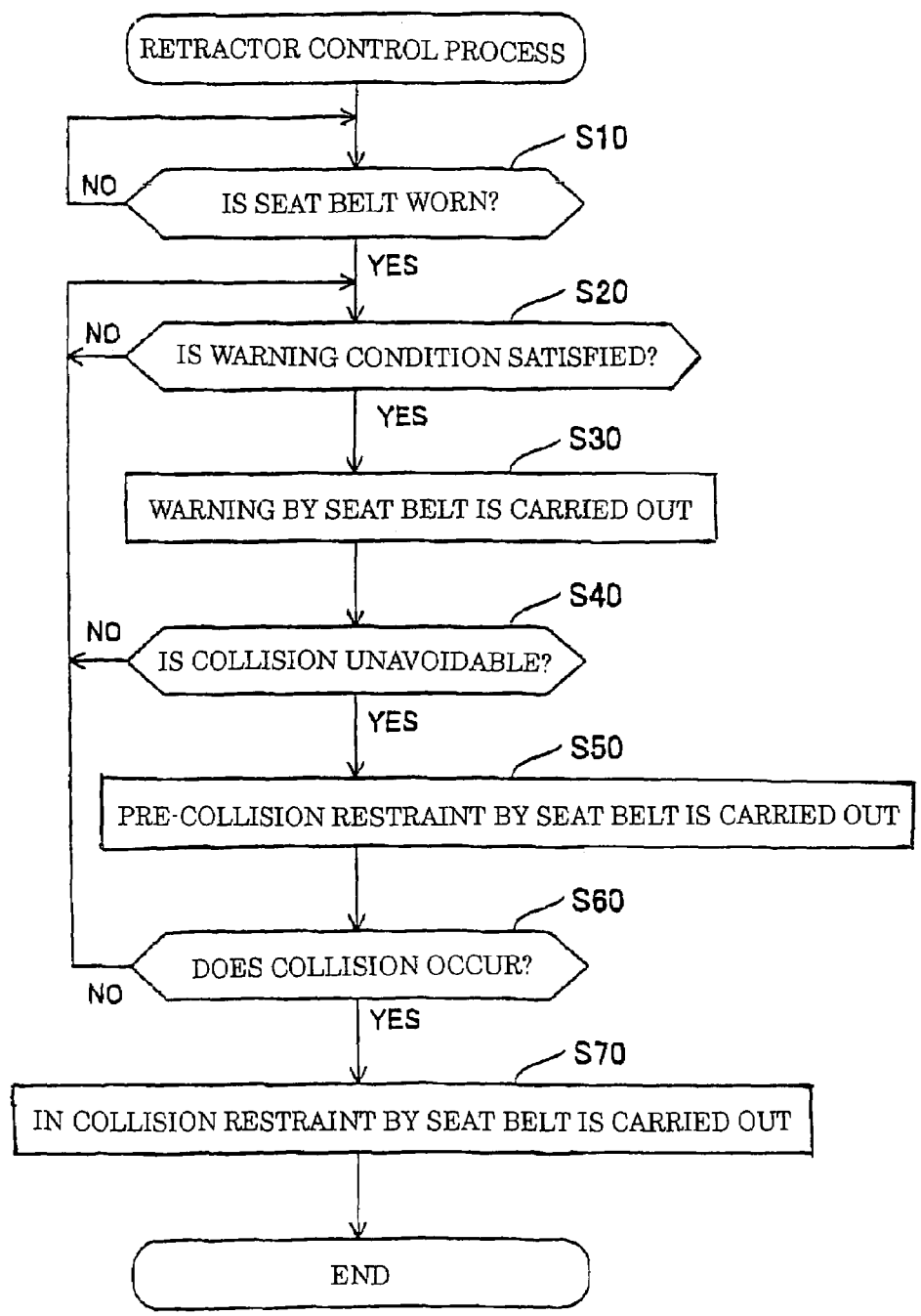
FIG. 10 is a flow chart showing the retractor control process in a seat belt retractor of any of the above embodiments.

FIG. 10 is a flow chart of the retractor control process in the seat belt retractor 1 of this embodiment.

As shown in FIG. 10, in the retractor control process, in step S10, it is determined whether the seat belt is in the worn state or not. Specifically, it is determined that the seat belt is in the worn state when the buckle switch 76a as shown in FIG. 1 detects that the tongue 72 is inserted into the buckle 76, while it is determined that the seat belt is not in the worn state when the buckle switch 76a detects that the insertion of the tongue 72 is cancelled. The process proceeds to step S20 when it is determined that the seat belt is in the worn state in step S110 (Yes in step S10).

In step S20 in FIG. 10, it is determined whether the condition for warning by the seat belt 3 is satisfied or not. Specifically, the condition is satisfied when it is determined that an obstacle (another vehicle, object, pedestrian or the like) exists within a predetermined range around the vehicle or when it is determined that the vehicle is highly likely to collide with the obstacle according to the information detected by the collision information detection sensor 82 as shown in FIG. 1, or when it is determined that the driver dozes according to the information detected by the sensor capable of detecting change in tension acting on the seat belt 3. The process proceeds to step S30 when the warning condition is satisfied in step S20 (Yes in step S20).

In step S30 in FIG. 10, the control is conducted according to the aforementioned warning mode. In this control, the motor is controlled to repeat the action of increasing and decreasing the tension acting on the seat belt 3 (temporally increasing the tension) a plurality of times, thereby warning the vehicle occupant (driver). Then, the process proceeds to step S40.

In step S40 in FIG. 10, it is determined whether a collision of the vehicle is unavoidable or not. Specifically, it is determined that the collision of the vehicle is unavoidable when a collision unavoidable signal indicating that a collision of the vehicle is unavoidable even when the vehicle occupant tries to avoid the collision (there is an extremely big risk that the vehicle will collide with an obstacle or the like) is detected according to the information detected by the collision information detection sensor 82 as shown in FIG. 1. The process proceeds to step S50 when it is determined that a collision is unavoidable in step S40 (Yes in step S40).

In step S50 in FIG. 10, the control is conducted according to the aforementioned pre-collision restraint mode. Specifically, the motor is controlled to drive in the belt winding direction to apply relatively strong tension onto the seat belt 3 when it is determined that a collision of the vehicle is unavoidable before the collision based on the information detected by the collision information detection sensor 82 as shown in FIG. 1.

In step S60 in FIG. 10, it is determined whether an actual collision of the vehicle occurs or not. Specifically, it is determined that an actual collision occurs when a collision occurrence signal indicating that a collision of the vehicle actually occurs is detected based on the information detected by the collision information detection sensor 82 as shown in FIG. 1. The process proceeds to step S70 when it is determined that an actual collision is occurs in step S60 (Yes in step S60).

In step S70 in FIG. 10, the control is conducted according to the aforementioned in-collision restraint mode. Specifically, the motor is controlled to drive in the belt winding direction to rapidly apply tension, which is larger (higher) than that in the warning mode and that in the pre-collision restraint mode, to the seat belt 3 when it is determined that a collision actually occurs based on the information detected by the collision information detection sensor 82 as shown in FIG. 1.

Figure 11:
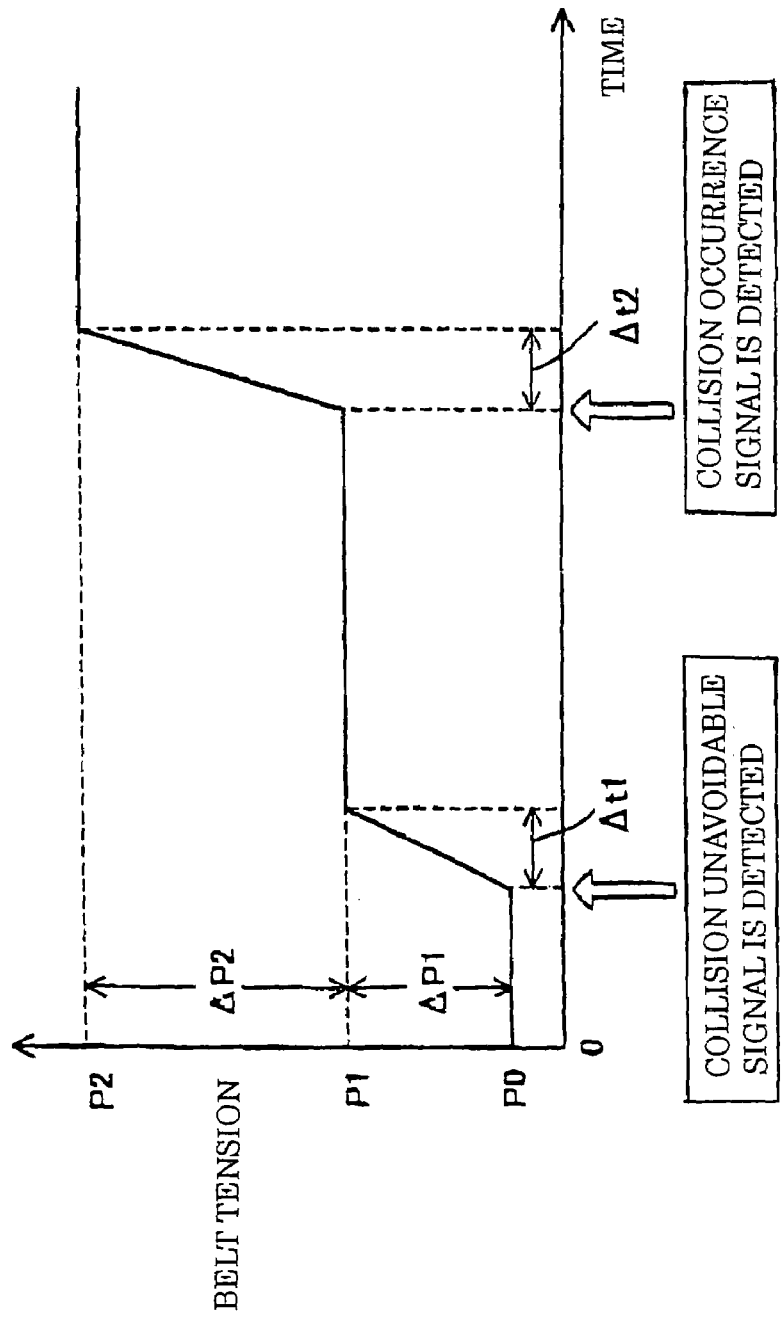
FIG. 11 is a graph showing an example of changes over time in seat belt tension during the retractor control process shown in FIG. 10.

FIG. 11 shows an example of changes over time in seat belt tension during the retractor control process shown in FIG. 10. In FIG. 11, changes over time in seat belt tension after step S40 in FIG. 10. The seat belt tension can be replaced with the seat belt winding force.

As shown in FIG. 11, as a collision unavoidable signal is detected in step S40 in FIG. 10, the ECU 78 controls the output of the motor to increase the seat belt tension from an initial value P0 (normally zero) to tension P1 during a time period $\Delta t1$. The amount of change in seat belt tension $\Delta P1$ is (P1−P0) and the seat belt winding velocity V1 is proportional to ($\Delta P1/\Delta t1$). The tension within a range from the tension P0 to the tension P1 acting on the seat belt 3 before the vehicle collision corresponds to the "first tension" of embodiments of the present invention.

After that, as a collision occurrence signal is detected in step S60 in FIG. 10, the ECU 78 controls the output of the motor to increase the seat belt tension from the first output P1 to a second output P2 during a time period $\Delta t2$. The amount of change in seat belt tension $\Delta P2$ is (P2−P1) and the seat belt winding velocity V2 is proportional to ($\Delta P2/\Delta t2$). The tension within a range from the tension P1 to the tension P2 acting on the seat belt 3 during the vehicle collision corresponds to the "second tension" of embodiments of the present invention.

In this embodiment, the amount of change in seat belt tension is set such that the amount of change $\Delta P2$ during the collision is larger than the amount of change $\Delta P1$ before the collision. The seat belt winding velocity is set such that the seat belt winding velocity V2 during the collision is larger than the seat belt winding velocity V1 before the collision. Since the output of the motor is calculated as the product of the current value (sometimes referred to as "control current value") and the voltage value (sometimes referred to as "applied voltage value"), the output of the motor, the number of rotations (rotation speed) of the motor, and the like are varied by suitably changing the current value and/or the voltage value, thereby controlling the seat belt tensions and the seat belt winding velocities before and during the collision to be within the respective ranges. The control of the driving of the motor according to the aforementioned setting is particularly effective in increasing the initial restraint capability for the vehicle occupant during the collision.

Since the seat belt apparatus 100 of this embodiment is structured to use same power source (the motor) and same mechanism (the motor speed reduction mechanism, the spool, and the like) which are arranged on the seat belt retractor side to conduct the action of increasing the tension on the seat belt 3 before the vehicle collision and during the vehicle collision as mentioned above, the seat belt apparatus 100 is effective in reducing the size, the weight, the cost of the apparatus as compared to an apparatus using separate mechanisms as a mechanism for increasing the tension on the seat belt before a vehicle collision and a mechanism for increasing the tension on the seat belt during the vehicle collision.

According to the seat belt apparatus 100 of this embodiment, the retractor control process shown in FIG. 10 is carried out particularly according to the control form as shown in FIG. 11 so that seat belt tension which is larger (higher) than that in the warning mode and that in the pre-collision restraint mode can be rapidly applied in the in-collision restraint mode, thereby improving the initial restraint for the occupant.

In the seat belt apparatus 100 of this embodiment with the seat belt retractor 1 of the first embodiment, the electric motor 53 is coaxially accommodated inside the cylindrical spool 52, thereby achieving the reduction in overall size and the reduction in weight of the retractor 1 and, in addition, improving the capability of insulating noise during the driving of the motor and the capability of shielding electromagnetic-wave generated from the motor 53.

In the seat belt apparatus 100 of this embodiment with the seat belt retractor 1 of the first embodiment, the size relating to the axial direction of the motor speed-reduction mechanism can be reduced by arrangement of the plural gears between the spool 52 and the motor 53, thereby further reducing the overall size relating to the axial direction of the retractor 1 including the motor speed-reduction mechanism.

In the seat belt apparatus 100 of this embodiment with the seat belt retractor 1' of the second embodiment, since the power transmission mechanism 8 has two power transmission paths, i.e. the high speed and low torque power transmission path serving as the low reduction ratio power transmission mode and the low speed and high torque power transmission path serving as the high reduction ratio power transmission mode, it is possible to achieve two winding functions, i.e. rapid belt winding for removing slack on the seat belt 3 in the low reduction ratio power transmission mode, and high-torque belt winding for restraining the occupant in the high reduction ratio power transmission mode.

Because the transmission path can be selected from the two power transmission paths, the rotational torque of the motor 6 is efficiently transmitted to the spool 4, thereby performing the two winding-up functions in a sure manner with small power consumption. In particular, high-torque seat belt winding is carried out with high torque for restraining the vehicle occupant through the low speed and high torque power transmission path so that the motor 6 is driven with small rotational torque as compared with the conventional one. Thus, a small-sized motor can be employed as the motor 6, as well as driving the motor with reduced power consumption, thereby reducing the size of the seat belt retractor 1'.

Because the aforementioned two winding functions are achieved, the seat belt retractor 1' is provided with a pretensioning function by rotational torque of the motor 6. Therefore, this can eliminate the necessity of a pretensioner using reaction gas in the conventional seat belt retractor, thereby reducing the cost.

The present invention is not limited to the aforementioned embodiment, so various variations and modifications may be made. For example, the following embodiments as variations of the aforementioned embodiment may be carried out.

Though the above embodiment has been described with regard to a case having seven seat belt setting modes with regard to the state of the seat belt 3, the number of the setting modes in embodiments of the present invention can be suitably changed if required. The seat belt retractor or the seat belt apparatus of embodiments of the present invention have at least two setting modes capable of increasing seat belt tension by using a same electric motor, a same motor speed-reduction mechanism, and a same spool before a collision and during the collision when the seat belt is in the worn state.

Though the above embodiment has been described with regard to a case using a single motor for winding up the seat belt before and during the collision, different motors which are disposed on the seat belt retractor side may be used for the action of winding up the seat belt before the collision and the action of winding up the seat belt during the collision, respectively.

Though the seat belt retractor 1 and the seat belt retractor 1' described in the above embodiments are used for the vehicle occupant seated in the driver's seat and is accommodated in the accommodating space in the B-pillar, embodiments of the present invention can be adopted to the structure of seat belt retractors for vehicle occupants seated in a passenger's seat and a rear seat. When embodiments of the present invention are adopted to the structure of a retractor for a vehicle occupant seated in the rear seat, the retractor is accommodated in an accommodating space in a C-pillar in case of an automobile of a type having two rows of seats or the retractor is accommodated in an accommodating space in a C-pillar or a D-pillar in case of an automobile of a type having three rows of seats. The accommodating space in the C-pillar or the D-pillar is often limited in the longitudinal direction of the vehicle. Especially in such case, a retractor having reduced size in the width direction such as the retractor 1 in the first embodiment is especially effective.

Though the above embodiment has been described with regard to the case that the seat belt retractor 1 or the seat belt retractor 1' is accommodated in the accommodating space in the pillar, embodiments of the present invention can be adopted to the structure in which the retractor is accommodated in an accommodating space in a member other than the pillar. For example, a vehicle seat such as a driver's seat or a passenger's seat as a first-row seat, or a seat as a second- or third-row seat may be provided with an accommodating space inside thereof and the seat belt retractor 1 or the seat belt retractor 1' of the embodiments can be accommodated in the accommodating space inside the seat. The size of the seat is often limited in the longitudinal direction of the vehicle similarly to the vehicle pillar. Especially in this case, a seat belt retractor having reduced size in the width direction such as the seat belt retractor 1 of the first embodiment is especially effective.

Though the above embodiment has been described with regard to the structure of the seat belt apparatus 100 to be installed in an automobile, embodiments of the present invention can be adopted to seat belt apparatuses to be installed in a vehicle for transfer of occupant(s) such as automobile, aircraft, boat, train, and bus.

Japan Priority Application 2005-154158, filed May 26, 2005 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt retractor to be installed in a vehicle comprising:
    an electric motor;
    a spool driven by the electric motor, wherein the spool is capable of winding and unwinding a seat belt for restraining a vehicle occupant;
    a motor speed reduction mechanism to reduce the rotation speed of the motor via a plurality of gears positioned between a driving shaft of the electric motor and the spool; and
    a control mechanism to control the electric motor;
    wherein when the seat belt is worn by the vehicle occupant the control mechanism is configured to control the motor in a first setting mode before a vehicle collision, a second setting mode before a vehicle collision, and a third setting mode during the vehicle collision;
    wherein the control mechanism is configured so that in the first setting mode the electric motor is driven repeatedly to rotate in a belt winding direction and a belt unwinding direction to alternately produce a stronger belt tension and a weaker belt tension when an obstacle is detected or a warning mode is detected;

wherein the control mechanism is configured so that in the second setting mode the electric motor is driven in a belt winding direction to apply a second setting tension on the seat belt, wherein the control mechanism controls the electric motor to operate in the second setting mode before a vehicle collision and after the first setting mode; and wherein the control mechanism is configured so that in the third setting mode the electric motor is driven in a belt winding direction to apply a third setting tension on the seat belt, wherein the control mechanism controls the electric motor to perform the third setting mode when the vehicle collision occurs.

2. A seat belt retractor as claimed in claim 1, wherein the third setting tension is larger than the second setting tension.

3. A seat belt apparatus to be installed in a vehicle comprising:
a seat belt to be worn by a vehicle occupant for restraining the vehicle occupant;
an electric motor;
a spool capable of winding and unwinding a seat belt according to the driving of the electric motor;
a motor speed reduction mechanism for reducing the rotation speed of the motor via a plurality of gears positioned between a driving shaft of the electric motor and the spool;
a control mechanism to control the driving of the electric motor;
a buckle fixed to a vehicle body;
a tongue attached to the seat belt and latched to the buckle when the seat belt is worn by the vehicle occupant; and
a detection sensor to detect the latching of the tongue to the buckle,
wherein when it is determined that the seat belt is worn by the vehicle occupant according to the information detected by the detection sensor, the control mechanism controls the motor in a first setting mode before a vehicle collision, a second setting mode before a vehicle collision, and a third setting mode during the vehicle collision;
wherein the control mechanism is configured so that in the first setting mode the electric motor is driven repeatedly to rotate in a belt winding direction and a belt unwinding direction to alternately produce a stronger belt tension and a weaker belt tension when an obstacle is detected or a warning mode is detected;
wherein the control mechanism is configured so that in the second setting mode the electric motor is driven in a belt winding direction to apply a second setting tension on the seat belt, wherein the control mechanism controls the electric motor to operate in the second setting mode before a vehicle collision and after the first setting mode; and
wherein the control mechanism is configured so that in the third setting mode the electric motor is driven in a belt winding direction to apply a third setting tension on the seat belt, wherein the control mechanism controls the electric motor to perform the third setting mode when the vehicle collision occurs.

4. A seat belt apparatus as claimed in claim 3, wherein the third setting tension is larger than the second setting tension.

5. A vehicle comprising:
a seat belt apparatus, the apparatus includes:
a seat belt to be worn by a vehicle occupant for restraining the vehicle occupant;
an electric motor;
a spool capable of winding and unwinding a seat belt according to the driving of the electric motor;
a motor speed reduction mechanism for reducing the rotation speed of the motor via a plurality of gears positioned between a driving shaft of the electric motor and the spool;
a control mechanism to control the driving of the electric motor;
a buckle fixed to a vehicle body;
a tongue attached to the seat belt and latched to the buckle when the seat belt is worn by the vehicle occupant; and
a detection sensor to detect the latching of the tongue to the buckle,
wherein when it is determined that the seat belt is worn by the vehicle occupant according to the information detected by the detection sensor, the control mechanism controls the motor in a first setting mode before a vehicle collision, a second setting mode before a vehicle collision, and a third setting mode during the vehicle collision;
wherein the control mechanism is configured so that in the first setting mode the electric motor is driven repeatedly to rotate in a belt winding direction and a belt unwinding direction to alternately produce a stronger belt tension and a weaker belt tension when an obstacle is detected or a warning mode is detected;
wherein the control mechanism is configured so that in the second setting mode the electric motor is driven in a belt winding direction to apply a second setting tension on the seat belt, wherein the control mechanism controls the electric motor to operate in the second setting mode before a vehicle collision and after the first setting mode; and
wherein the control mechanism is configured so that in the third setting mode the electric motor is driven in a belt winding direction to apply a third setting tension on the seat belt, wherein the control mechanism controls the electric motor to perform the third setting mode when the vehicle collision occurs, and
wherein the seat belt apparatus is accommodated in an accommodating space in the vehicle.

6. A vehicle as claimed in claim 5, wherein the third setting tension is larger than the second setting tension.

7. A seat belt retractor as claimed in claim 1, wherein a length of a motor housing in an axial direction is equal to a size of a spool outer periphery in a width direction.

8. A seat belt retractor as claimed in claim 1, wherein the motor is accommodated in a hollow space in the spool.

9. A seat belt retractor as claimed in claim 1, wherein a ratio of an outside diameter of a motor housing of the motor relative to an outside diameter of a spool outer periphery of the spool is 0.8 or less.

10. A seat belt retractor as claimed in claim 1, wherein a storage volume within the seatbelt retractor is less than a sum of a volume of a motor housing of the motor and a volume of a cylinder portion of the spool.

11. A seat belt retractor as claimed in claim 1, wherein the motor is an inner rotor motor.

12. A seat belt retractor as claimed in claim 1, wherein the plurality of gears includes a sun gear, and wherein the sun gear is attached to the driving shaft of the motor.

13. A seat belt retractor as claimed in claim 12, wherein the plurality of gears further includes a plurality of planetary gears, and wherein the plurality of planetary gears mesh with an outer periphery of the sun gear.

14. A seat belt apparatus as claimed in claim 3, wherein a length of a motor housing in an axial direction is equal to a size of a spool outer periphery in a width direction.

15. A seat belt apparatus as claimed in claim 3, wherein the motor is accommodated in a hollow space in the spool.

16. A seat belt apparatus as claimed in claim 3, wherein a ratio of an outside diameter of a motor housing of the motor relative to an outside diameter of a spool outer periphery of the spool is 0.8 or less.

17. A seat belt apparatus as claimed in claim 3, wherein a storage volume within the seatbelt retractor is less than a sum of a volume of a motor housing of the motor and a volume of a cylinder portion of the spool.

18. A seat belt apparatus as claimed in claim 3, wherein the motor is an inner rotor motor.

19. A seat belt apparatus as claimed in claim 3, wherein the plurality of gears includes a sun gear, and wherein the sun gear is attached to the driving shaft of the motor.

20. A seat belt apparatus as claimed in claim 19, wherein the plurality of gears further includes a plurality of planetary gears, and wherein the plurality of planetary gears mesh with an outer periphery of the sun gear.

21. A vehicle as claimed in claim 5, wherein a length of a motor housing in an axial direction is equal to a size of a spool outer periphery in a width direction.

22. A vehicle as claimed in claim 5, wherein the motor is accommodated in a hollow space in the spool.

23. A vehicle as claimed in claim 5, wherein a ratio of an outside diameter of a motor housing of the motor relative to an outside diameter of a spool outer periphery of the spool is 0.8 or less.

24. A vehicle as claimed in claim 5, wherein a storage volume within the seatbelt retractor is less than a sum of a volume of a motor housing of the motor and a volume of a cylinder portion of the spool.

25. A vehicle as claimed in claim 5, wherein the motor is an inner rotor motor.

26. A vehicle as claimed in claim 5, wherein the plurality of gears includes a sun gear, and wherein the sun gear is attached to the driving shaft of the motor.

27. A vehicle as claimed in claim 26, wherein the plurality of gears further includes a plurality of planetary gears, and wherein the plurality of planetary gears mesh with an outer periphery of the sun gear.

* * * * *